US012695894B2

(12) United States Patent
Chen

(10) Patent No.: US 12,695,894 B2
(45) Date of Patent: Jul. 28, 2026

(54) MEMORY STRUCTURE, STORAGE METHOD, ENTROPY DECODING METHOD, CHIP, DEVICE, AND STORAGE MEDIUM

(71) Applicant: Amlogic (Shanghai) Co., Ltd., Shanghai (CN)

(72) Inventor: Shi Chen, Shanghai (CN)

(73) Assignee: Amlogic (Shanghai) Co., Ltd., Shanghai (CN)

( * ) Notice: Subject to any disclaimer, the term of this patent is extended or adjusted under 35 U.S.C. 154(b) by 124 days.

(21) Appl. No.: 18/948,983

(22) Filed: Nov. 15, 2024

(65) Prior Publication Data

US 2025/0168374 A1　May 22, 2025

(30) Foreign Application Priority Data

Nov. 20, 2023　(CN) .......................... 202311551452.4

(51) Int. Cl.
| | |
|---|---|
| *H04N 19/423* | (2014.01) |
| *H04N 19/105* | (2014.01) |
| *H04N 19/13* | (2014.01) |
| *H04N 19/91* | (2014.01) |

(52) U.S. Cl.
CPC ......... *H04N 19/423* (2014.11); *H04N 19/105* (2014.11); *H04N 19/13* (2014.11); *H04N 19/91* (2014.11)

(58) Field of Classification Search
CPC .... H04N 19/423; H04N 19/105; H04N 19/13; H04N 19/91; G11C 5/02

USPC .......................................................... 365/51
See application file for complete search history.

(56) References Cited

U.S. PATENT DOCUMENTS

2021/0279299 A1* 9/2021 Georgopoulos .... G06F 12/0871

* cited by examiner

*Primary Examiner* — Fernando Hidalgo
(74) *Attorney, Agent, or Firm* — Schwegman Lundberg & Woessner, P.A.

(57)　ABSTRACT

Disclosed are a memory structure, a storage method, an entropy decoding method, a chip, a device, and a storage medium. The memory structure includes: a row storage circuit including a plurality of row storage components in a number identical to a number of rows of a decoding unit, where the row storage components correspond one-to-one to ordinates of the decoding unit, and each row storage component is configured to store a coding coefficient under a corresponding ordinate, and an abscissa of the coding coefficient; a column storage circuit including a plurality of column storage components in a number identical to a number of columns of the decoding unit, where the column storage components correspond one-to-one to abscissas of the decoding unit, and each column storage component is configured to store a coding coefficient under a corresponding abscissa, and an ordinate of the stored coding coefficient; and diagonal storage components in a number equaling 1 subtracted from the sum of the number of rows and the number of columns of the decoding unit, where each diagonal storage component is configured to store a coding coefficient on a corresponding diagonal position line, and an abscissa or an ordinate of the stored coding coefficient. According to the disclosure, an occupied area of the memory structure is reduced.

20 Claims, 3 Drawing Sheets

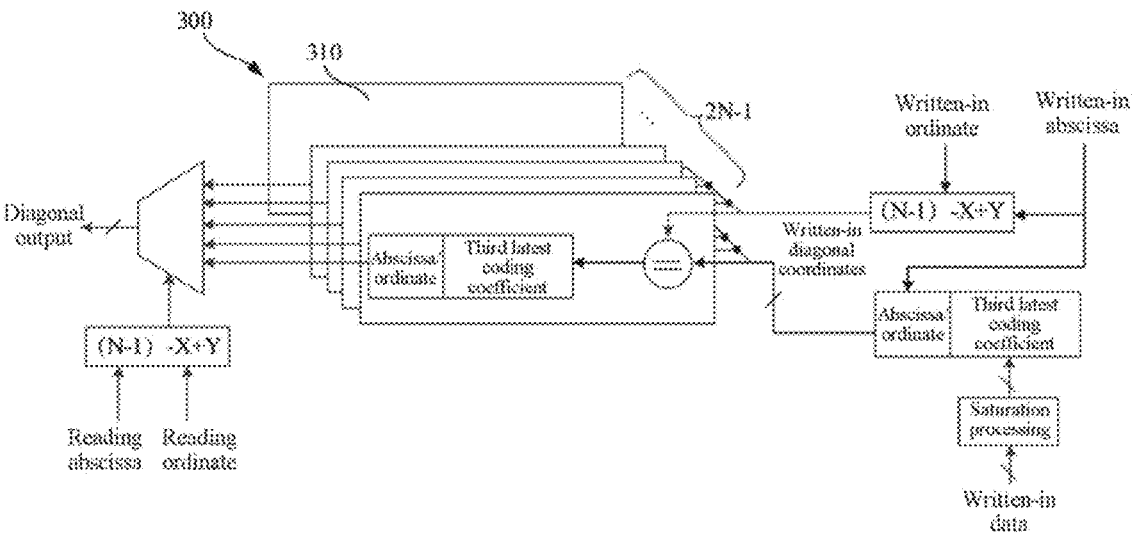

FIG. 3

| | |
|---|---|
| Store a coding coefficient and an abscissa of the coding coefficient in a coefficient coding block in a corresponding row storage component based on an ordinate of the coding coefficient in the coefficient coding block | S01 |
| Store the coding coefficient and the ordinate of the coding coefficient in the coefficient coding block in a corresponding column storage component based on the abscissa of the coding coefficient in the coefficient coding block | S02 |
| Performing saturation processing on the coding coefficient, so as to obtain a third latest coding coefficient, where the saturation processing is configured to enable a bit width of the third latest coding coefficient to equal a preset bit number required by a reference point most adjacent to a target point in a diagonal direction, and the target point is a position point currently to be decoded in the coefficient coding block | S04 |
| Store the coding coefficient and the abscissa or the ordinate of the coding coefficient in the coefficient coding block in a corresponding diagonal storage component based on a diagonal position line on which the coding coefficient is positioned | S03 |

FIG. 4

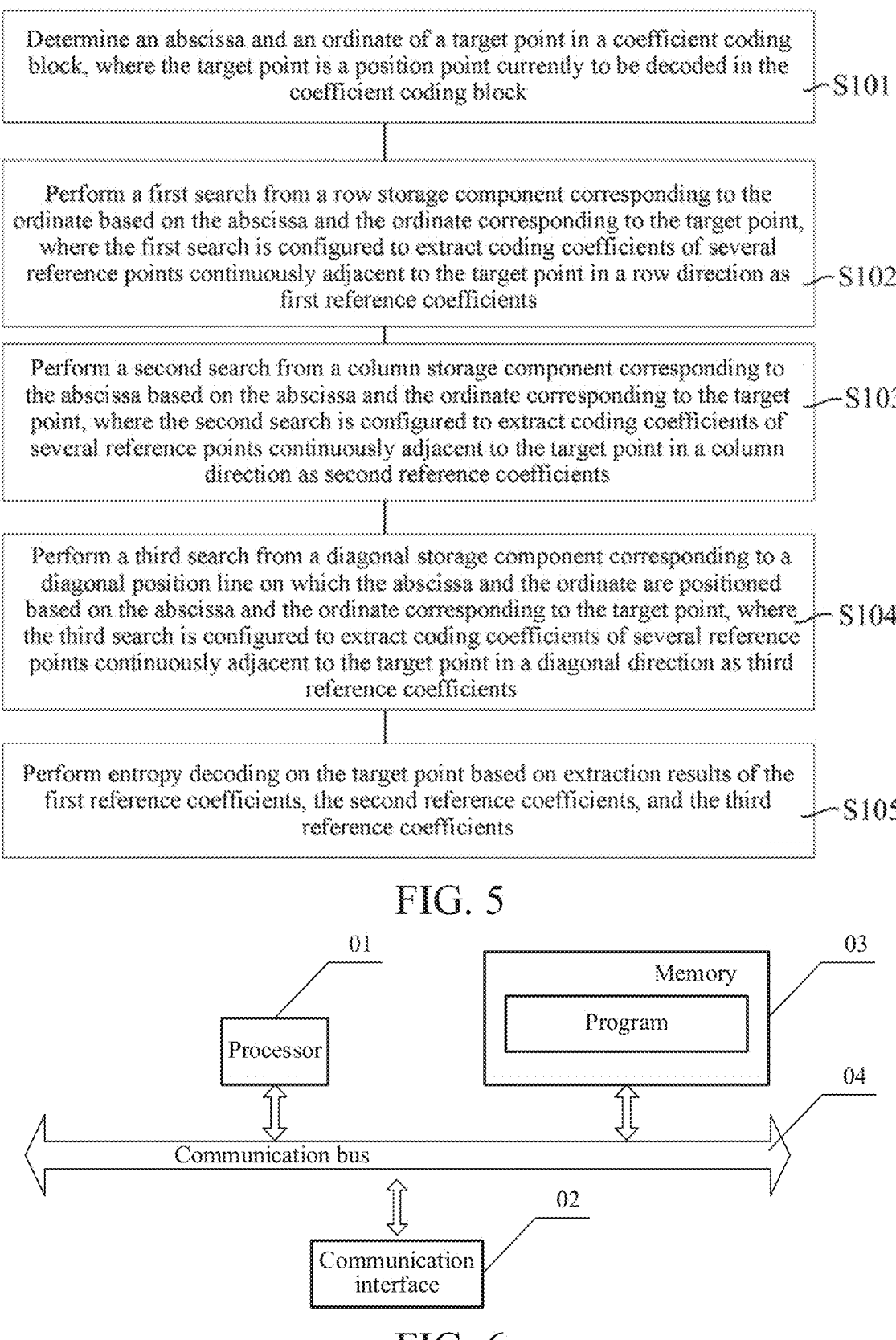

Determine an abscissa and an ordinate of a target point in a coefficient coding block, where the target point is a position point currently to be decoded in the coefficient coding block ——S101

Perform a first search from a row storage component corresponding to the ordinate based on the abscissa and the ordinate corresponding to the target point, where the first search is configured to extract coding coefficients of several reference points continuously adjacent to the target point in a row direction as first reference coefficients ——S102

Perform a second search from a column storage component corresponding to the abscissa based on the abscissa and the ordinate corresponding to the target point, where the second search is configured to extract coding coefficients of several reference points continuously adjacent to the target point in a column direction as second reference coefficients ——S103

Perform a third search from a diagonal storage component corresponding to a diagonal position line on which the abscissa and the ordinate are positioned based on the abscissa and the ordinate corresponding to the target point, where the third search is configured to extract coding coefficients of several reference points continuously adjacent to the target point in a diagonal direction as third reference coefficients ——S104

Perform entropy decoding on the target point based on extraction results of the first reference coefficients, the second reference coefficients, and the third reference coefficients ——S105

FIG. 5

Processor    01

Memory    03
Program

04

Communication bus

Communication interface    02

MEMORY STRUCTURE, STORAGE METHOD, ENTROPY DECODING METHOD, CHIP, DEVICE, AND STORAGE MEDIUM

CLAIM OF PRIORITY

This application claims the benefit of priority under 35 U.S.C. § 119 to Chinese Patent Application No. 202311551452.4, filed on Nov. 20, 2023, which is incorporated by reference herein in its entirety.

TECHNICAL FIELD

Embodiments of the disclosure relate to the technical field of video processing, and in particular to a memory structure, a storage method, an entropy decoding method, a chip, a device, and a storage medium.

BACKGROUND

With the ongoing development of network technology and video technology, an increasing number of videos have been applied to a variety of industries, and digital videos have taken a significant role in modern human society. In consideration of a vast number of data carried by the videos, video data have to be compressed and coded in practical application, so as to alleviate the pressure of storage and transmission. A coder processes the video data through prediction, transformation, quantization, entropy coding, etc., so as to compress the data into a video code stream. The video code stream can be stored or transmitted over networks. A decoder decodes the video code stream through entropy decoding, inverse quantization, inverse transformation, and prediction compensation, so as to reconstruct the video data.

It is common practice to perform entropy coding through a coefficient coding block corresponding to a coding unit (CU), a basic unit of video coding. A coding coefficient in the coefficient coding block can be obtained by performing an inverse operation through entropy decoding, so that the video code stream is decoded.

However, memory structures currently used to store coding coefficients occupy a large area.

SUMMARY

A problem to be solved in embodiments of the disclosure is to provide a memory structure, a storage method, an entropy decoding method, a chip, a device, and a storage medium. Therefore, a number of storage components in the memory structure is reduced, and an occupied area of the memory structure is reduced accordingly.

To solve the above problem, a memory structure is provided in the embodiments of the disclosure. The memory structure is configured to store a coding coefficient, obtained through entropy decoding, in a coefficient coding block; and the memory structure includes: a row storage circuit including a plurality of row storage components in a number identical to a number of rows of a decoding unit, where the row storage components correspond one-to-one to ordinates of the decoding unit, and each row storage component is configured to store a coding coefficient under a corresponding ordinate, and an abscissa of the stored coding coefficient in the coefficient coding block; a column storage circuit including a plurality of column storage components in a number identical to a number of columns of the decoding unit, where the column storage components correspond one-to-one to abscissas of the decoding unit, and each column storage component is configured to store a coding coefficient under a corresponding abscissa, and an ordinate of the stored coding coefficient in the coefficient coding block; and a diagonal storage circuit including a plurality of diagonal storage components, where a number of the diagonal storage components equals 1 subtracted from the sum of the number of rows and the number of columns of the decoding unit, and the diagonal storage components correspond one-to-one to diagonal position lines; the diagonal position lines include a diagonal of the decoding unit and a plurality of parallel lines parallel to the diagonal; and each diagonal storage component is configured to store a coding coefficient on a corresponding diagonal position line, and an abscissa or an ordinate of the stored coding coefficient in the coefficient coding block.

Correspondingly, a coefficient storage method using the memory structure in the foregoing embodiment is further provided in the embodiments of the disclosure. The coefficient storage method is configured to store a coding coefficient, obtained through entropy decoding, in a coefficient coding block; and the coefficient storage method includes: storing the coding coefficient and an abscissa of the coding coefficient in the coefficient coding block in a corresponding row storage component based on an ordinate of the coding coefficient in the coefficient coding block; storing the coding coefficient and the ordinate of the coding coefficient in the coefficient coding block in a corresponding column storage component based on the abscissa of the coding coefficient in the coefficient coding block; and storing the coding coefficient and the abscissa or the ordinate of the coding coefficient in the coefficient coding block in a corresponding diagonal storage component based on a diagonal position line on which the coding coefficient is positioned.

Correspondingly, an entropy decoding method is further provided in the embodiments of the disclosure. The entropy decoding method is performed based on a coding coefficient stored in the memory structure in the foregoing embodiment; and the entropy decoding method includes: determining an abscissa and an ordinate of a target point in a coefficient coding block, where the target point is a position point currently to be decoded in the coefficient coding block; performing a first search from a row storage component corresponding to the ordinate based on the abscissa and the ordinate corresponding to the target point, where the first search is configured to extract coding coefficients of several reference points continuously adjacent to the target point in a row direction as first reference coefficients; performing a second search from a column storage component corresponding to the abscissa based on the abscissa and the ordinate corresponding to the target point, where the second search is configured to extract coding coefficients of several reference points continuously adjacent to the target point in a column direction as second reference coefficients; performing a third search from a diagonal storage component corresponding to a diagonal position line on which the abscissa and the ordinate are positioned based on the abscissa and the ordinate corresponding to the target point, where the third search is configured to extract coding coefficients of several reference points continuously adjacent to the target point in a diagonal direction as third reference coefficients; and performing entropy decoding on the target point based on extraction results of the first reference coefficients, the second reference coefficients, and the third reference coefficients.

Correspondingly, a chip is further provided in the embodiments of the disclosure. The chip includes the memory structure in the foregoing embodiment.

Correspondingly, a device is further provided in the embodiments of the disclosure. The device includes at least one memory and at least one processor, where the memory stores one or more computer instructions, and the one or more computer instructions are executed by the processor, so as to implement the coefficient storage method according to the embodiment of the disclosure or the entropy decoding method according to the embodiment of the disclosure.

Correspondingly, a storage medium is further provided in the embodiments of the disclosure. The storage medium stores one or more computer instructions, where the one or more computer instructions are configured to implement the coefficient storage method according to the embodiment of the disclosure or the entropy decoding method according to the embodiment of the disclosure.

Compared with the prior art, the technical solutions in the embodiments of the disclosure have the advantages as follows:

In the memory structure according to the embodiment of the disclosure, the memory structure includes the row storage circuit, the column storage circuit, and the diagonal storage circuit. When an entropy decoding operation is performed, after the target point currently to be decoded in the coefficient coding block is determined, entropy decoding calculation is performed generally according to other coding coefficients around the target point, i.e. according to the coding coefficients of several reference points continuously adjacent in the row direction, the coding coefficients of several reference points continuously adjacent in the column direction, and the coding coefficients of several reference points continuously adjacent in the diagonal direction. Therefore, based on entropy decoding, the row storage components correspond one-to-one to the ordinates of the decoding unit, and each row storage component is configured to store the coding coefficient under the corresponding ordinate. After the coordinates corresponding to the target point are determined, the corresponding row storage component may be found according to the ordinate of the target point. Several coding coefficients adjacent in the row direction and having the same ordinate are searched for according to the abscissa of the target point, so that the column storage components correspond one-to-one to the abscissas of the decoding unit, and each column storage component is configured to store the coding coefficient under the corresponding abscissa. After the coordinates corresponding to the target point are determined, the corresponding column storage components may be found according to the abscissa of the target point. Several coding coefficients adjacent in the column direction and having the same abscissa are searched for according to the ordinate of the target point, so that the diagonal storage components correspond one-to-one to diagonal position lines of the decoding unit, and each diagonal storage component is configured to store the coding coefficient on the corresponding diagonal position line. After the coordinates corresponding to the target point are determined, the corresponding diagonal storage component may be found according to the ordinate and the abscissa of the target point. Several coding coefficients adjacent in the diagonal direction and having preset coordinate offset are searched for according to the abscissa or the ordinate of the target point. In conclusion, compared with the solution of a storage array having the same layout as the decoding unit, the row storage circuit, the column storage circuit, and the diagonal storage circuit are employed in the embodiment of the disclosure, so that the number of the storage components in the memory structure is reduced, and the occupied area of the memory structure is reduced accordingly.

In an optional solution, the memory structure includes a flip flop structure, and in other words, the storage components in the row storage circuit, the column storage circuit, and the diagonal storage circuit are registers. Since the registers have a higher response speed, a speed of entropy decoding can be increased, so as to satisfy a speed requirement of video decoding while the occupied area of the memory structure is reduced.

BRIEF DESCRIPTION OF THE DRAWINGS

FIG. 3 shows a schematic structural diagram of a diagonal storage circuit and a schematic diagram of a working process thereof according to an embodiment of a memory structure of the disclosure;

FIG. 4 is a schematic flowchart of an embodiment of a coefficient storage method of the disclosure;

FIG. 5 is a schematic flowchart of an embodiment of an entropy decoding method of the disclosure; and FIG. 6 is a structural diagram of hardware of a device according to an embodiment of the disclosure.

DETAILED DESCRIPTION

Figure 1:
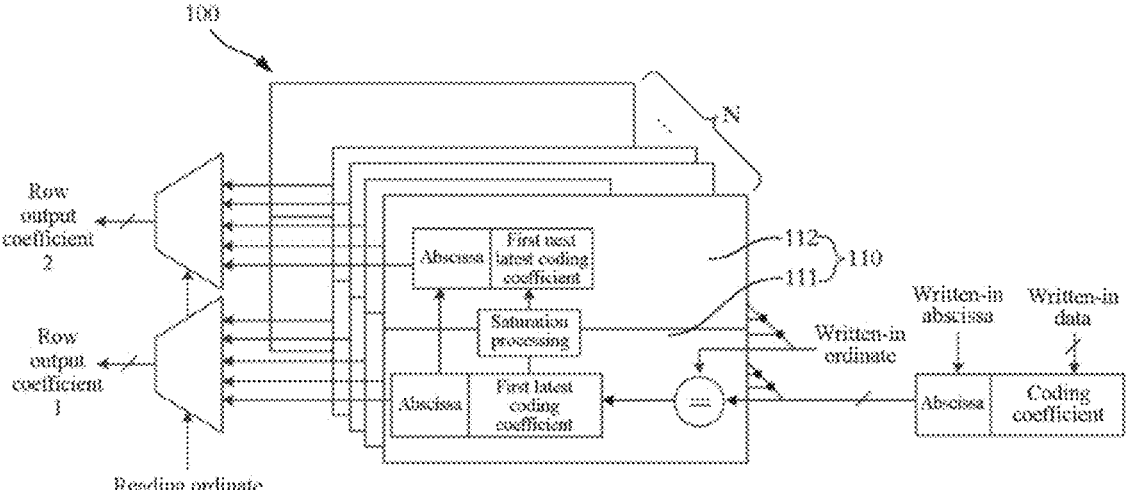
FIG. 1 shows a schematic structural diagram of a row storage circuit and a schematic diagram of a working process thereof according to an embodiment of a memory structure of the disclosure.

It can be seen from the background art that memory structures currently configured to store a coding coefficient obtained through entropy decoding occupy a large area.

Specifically, to store the coding coefficient in a coefficient coding block, the memory structure generally employs a storage array having the same layout as a decoding unit (i.e. having the same layout as the coefficient coding block). In other words, the memory structure includes a plurality of storage components arranged in an array, and the storage array corresponds one-to-one to coordinate information of position point of the coefficient coding block. Therefore, when entropy decoding is performed on one target point in the coefficient coding block, coding coefficients of position points around the target point can be rapidly located in the storage array.

However, if the memory structure employs the storage array, a large number of storage components is caused, resulting in a large occupied area of the memory structure. For example, if the coefficient coding block is an N×N matrix, $N^2$ storage components are required.

To solve the technical problem, a memory structure is provided in embodiments of the disclosure. The memory structure is configured to store a coding coefficient, obtained through entropy decoding, in a coefficient coding block; and the memory structure includes: a row storage circuit including a plurality of row storage components in a number identical to a number of rows of a decoding unit, where the row storage components correspond one-to-one to ordinates of the decoding unit, and each row storage component is configured to store a coding coefficient under a corresponding ordinate, and an abscissa of the stored coding coefficient in the coefficient coding block; a column storage circuit including a plurality of column storage components in a number identical to a number of columns of the decoding unit, where the column storage components correspond one-to-one to abscissas of the decoding unit, and each column storage component is configured to store a coding coefficient under a corresponding abscissa, and an ordinate of the stored coding coefficient in the coefficient coding block; and a diagonal storage circuit including a plurality of diagonal storage components, where a number of the diagonal storage components equals 1 subtracted from the sum of the number of rows and the number of columns of the decoding unit, and the diagonal storage components correspond one-to-one to diagonal position lines; the diagonal position lines include a diagonal of the decoding unit and a plurality of parallel lines parallel to the diagonal; and each diagonal storage component is configured to store a coding coefficient on a corresponding diagonal position line, and an abscissa or an ordinate of the stored coding coefficient in the coefficient coding block.

Compared with the solution of the storage array having the same layout as the decoding unit, the row storage circuit, the column storage circuit, and the diagonal storage circuit are employed in the embodiment of the disclosure. For the row storage circuit, each coding coefficient under the same ordinate is stored in the same row storage component. For the column storage circuit, each coding coefficient under the same abscissa is stored in the same column storage component. For the diagonal storage circuit, each coding coefficient positioned on the same diagonal position line is stored in the same diagonal storage component. Therefore, the number of the storage components in the memory structure is reduced, and the occupied area of the memory structure is reduced accordingly.

To make the above objectives, features, and advantages of the disclosure more apparent and understandable, specific embodiments of the disclosure are described in detail below in conjunction with the accompanying drawings.

Figure 2:
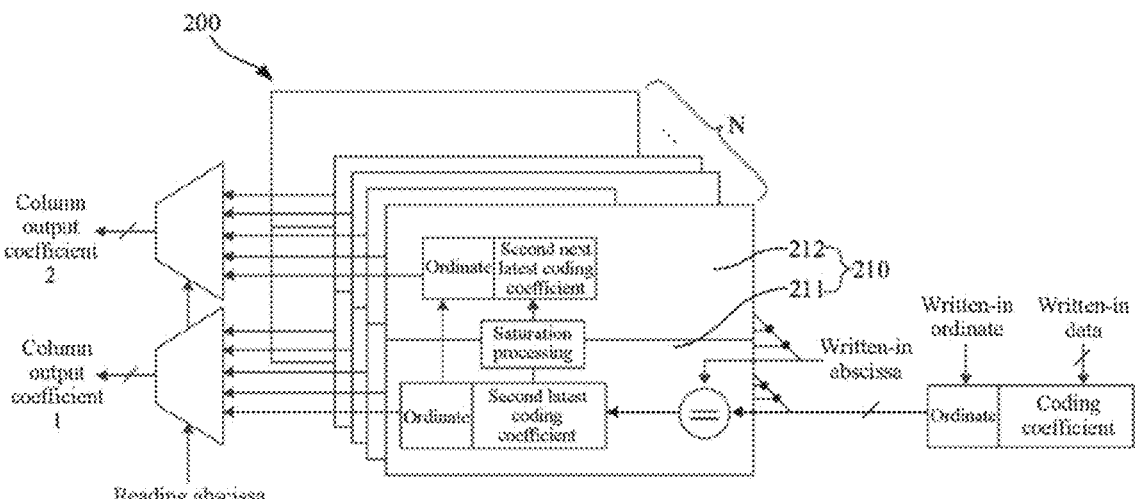
FIG. 2 shows a schematic structural diagram of a column storage circuit and a schematic diagram of a working process thereof according to an embodiment of a memory structure of the disclosure.

With reference to FIGS. 1-3, a schematic structural diagram and a schematic diagram of a working process according to an embodiment of a memory structure of the disclosure are shown respectively.

FIG. 1 shows a schematic structural diagram of a row storage circuit 100 and a schematic diagram of a working process thereof according to an embodiment of a memory structure of the disclosure. FIG. 2 shows a schematic structural diagram of a column storage circuit 200 and a schematic diagram of a working process thereof according to an embodiment of a memory structure of the disclosure. FIG. 3 shows a schematic structural diagram of a diagonal storage circuit 300 and a schematic diagram of a working process thereof according to an embodiment of a memory structure of the disclosure.

In the embodiment, the memory structure is configured to store the coding coefficient, obtained through entropy decoding, in the coefficient coding block (CB), so as to provide information required for entropy decoding on a next target point (for example, coding coefficients of position points around the target point and a number of non-zero coding coefficients).

It should be noted that in video coding, a coding operation is performed on the coding unit (CU). Specifically, after the coefficient coding block corresponding to the coding unit is obtained, an entropy coding operation is performed based on the coding coefficient in the coefficient coding block.

The coding unit is a matrix, and correspondingly, the coefficient coding block is also a matrix. Specifically, the coefficient coding block is also an m×n matrix, where m denotes a number of rows of the matrix, n denotes a number of columns of the matrix, m and n are natural numbers, m has a value ranging from 1 to 32, n has a value ranging from 1 to 32, and m and n may have the same value or not. For example, a size of the coefficient coding block may be 32×32, 16×16, 8×8, or 4×4.

Specifically, the memory structure is configured to store the coding coefficient obtained through entropy decoding. The coding coefficient obtained through entropy decoding is stored to prepare for a next entropy decoding operation. Specifically, when entropy decoding is performed on the target point subsequently, other coding coefficients around the target point are extracted from the memory structure, so that the entropy decoding calculation is performed on the target point based on the coding coefficients extracted. The target point is a position currently to be decoded in the coefficient coding block.

In a process of video processing, the coding operation is performed on video data through processes such as prediction, transformation, quantization, and entropy coding, so as to compress the data into a video code stream, and the decoding operation is performed on the video code stream through entropy decoding, inverse quantization, inverse transformation, and prediction compensation, so as to reconstruct the video data. Therefore, by storing the coding coefficient obtained through entropy decoding, the coding coefficients of surrounding adjacent position points required for entropy decoding on the next coding coefficient can be rapidly provided, so that the efficiency of entropy decoding is improved.

In view of the above, in the embodiment, the coding coefficient is a non-zero coefficient, and in other words, the memory structure is configured to store the non-zero coefficient. When the entropy coding operation is performed, only the non-zero coefficient is coded, and there are few non-zero coefficients in general, so that a code rate of the video code stream is saved on.

It should be noted that since a process of entropy decoding includes absolute value decoding and sign bit decoding, and only an absolute value of a coefficient of an adjacent position point is required for solving an absolute value of a next coding coefficient through entropy decoding, the coding coefficient stored in the memory structure is the absolute value of the coefficient. With the size of the coefficient coding block of 32×32 as an example, a bit width of the coding coefficient stored in the memory structure is 15 bits.

Specifically, a bit width of original data corresponding to the coding coefficient is 16 bits, and the memory structure is configured to store the absolute value of the coefficient, and a sign configured to indicate a positive or a negative occupies 1 bit. Therefore, the bit width of the coding coefficient stored in the memory structure is 15 bits.

In addition, when the coding coefficient obtained through entropy decoding is stored in the memory structure based on a written-in abscissa and a written-in ordinate, a bit width of the written-in abscissa and the written-in ordinate is 5 bits.

In the embodiment, the coding coefficient is obtained based on a versatile video coding (VVC) standard, and in other words, the memory structure is suitable for versatile video coding.

In the embodiment, the memory structure includes: a row storage circuit 100 (as shown in FIG. 1) including a plurality of row storage components 110 in a number identical to a number of rows of a decoding unit, where the row storage components 110 correspond one-to-one to ordinates of the decoding unit, and each row storage component 110 is configured to store a coding coefficient under a corresponding ordinate, and an abscissa of the stored coding coefficient in the coefficient coding block; a column storage circuit 200 (as shown in FIG. 2) including a plurality of column storage components 210 in a number identical to a number of columns of the decoding unit, where the column storage components 210 correspond one-to-one to abscissas of the decoding unit, and each column storage component 210 is configured to store a coding coefficient under a corresponding abscissa, and an ordinate of the stored coding coefficient in the coefficient coding block; and a diagonal storage circuit 300 (as shown in FIG. 3) including a plurality of diagonal storage components 310, where a number of the diagonal storage components 310 equals 1 subtracted from the sum of the number of rows and the number of columns of the decoding unit, and the diagonal storage components 310 correspond one-to-one to diagonal position lines; the diagonal position lines include a diagonal of the decoding unit and a plurality of parallel lines parallel to the diagonal; and each diagonal storage component 310 is configured to store a coding coefficient on a corresponding diagonal position line, and an abscissa or an ordinate of the stored coding coefficient in the coefficient coding block.

In addition, the abscissa and the ordinate of the coding coefficient in the coefficient coding block are configured to indicate position information of the coding coefficient in the corresponding coefficient coding block.

It can be understood that the memory structure is configured to store the coding coefficient, obtained through entropy decoding, in the coefficient coding block, and the coding coefficient is the coefficient obtained through entropy coding. Therefore, the coding coefficient stored in the memory structure is the coefficient configured to perform an inverse quantization operation after entropy decoding.

When an entropy decoding operation is performed, after the target point currently to be decoded in the coefficient coding block is determined, entropy decoding calculation is performed generally according to other coding coefficients around the target point, i.e. according to coding coefficients of several reference points continuously adjacent in a row direction, coding coefficients of several reference points continuously adjacent in a column direction, and coding coefficients of several reference points continuously adjacent in a diagonal direction. Therefore, based on entropy decoding, the row storage components 110 correspond one-to-one to the ordinates of the decoding unit, and each row storage component 110 is configured to store the coding coefficient under the corresponding ordinate. After the coordinates corresponding to the target point are determined, the corresponding row storage component 110 may be found according to the ordinate of the target point. Several coding coefficients adjacent in the row direction and having the same ordinate are searched for according to the abscissa of the target point, so that the column storage components 210 correspond one-to-one to the abscissas of the decoding unit, and each column storage component 210 is configured to store the coding coefficient under the corresponding abscissa. After the coordinates corresponding to the target point are determined, the corresponding column storage components 210 may be found according to the abscissa of the target point. Several coding coefficients adjacent in the column direction and having the same abscissa are searched for according to the ordinate of the target point, so that the diagonal storage components 310 correspond one-to-one to diagonal position lines of the decoding unit, and each diagonal storage component 310 is configured to store the coding coefficient on the corresponding diagonal position line. After the coordinates corresponding to the target point are determined, the corresponding diagonal storage component 310 may be found according to the ordinate and the abscissa of the target point. Several coding coefficients adjacent in the diagonal direction and having preset coordinate offset are searched for according to the abscissa or the ordinate of the target point.

Compared with the solution of a storage array having the same layout as the decoding unit, the row storage circuit 100, the column storage circuit 200, and the diagonal storage circuit 300 are employed in the embodiment of the disclosure. For the row storage circuit 100, each coding coefficient under the same ordinate is stored in the same row storage component 110. For the column storage circuit 200, each coding coefficient under the same abscissa is stored in the same column storage component 210. For the diagonal storage circuit 300, each coding coefficient positioned on the same diagonal position line is stored in the same diagonal storage component 310. Therefore, the number of the storage components in the memory structure is reduced, and the occupied area of the memory structure is reduced accordingly.

Moreover, when entropy decoding is performed, the coding coefficients of several reference points continuously adjacent in the row direction, the coding coefficients of several reference points continuously adjacent in the column direction, and the coding coefficients of several reference points continuously adjacent in the diagonal direction may be simultaneously extracted through the row storage circuit 100, the column storage circuit 200, and the diagonal storage circuit 300. Therefore, the speed of entropy decoding is increased, and the speed requirement of video decoding is satisfied.

The coding unit is a basic unit in video coding, and accordingly, the decoding unit is a basic unit in video decoding.

It should be noted that the coding unit and the decoding unit are matrices, and thus there are row directions and column directions of the matrices.

In the embodiment, the number of the row storage components 110 is identical to a number of rows of a maximum decoding unit; the number of the column storage components 210 is identical to a number of columns of the maximum decoding unit; and the number of the diagonal storage components 310 equals 1 subtracted from the sum of the number of rows and the number of columns of the maximum decoding unit.

The memory structure is designed according to the number of rows and the number of columns of the maximum decoding unit, so as to be compatible with coefficient coding blocks of various sizes.

Specifically, the number of rows of the maximum decoding unit is identical to the number of columns thereof, the maximum decoding unit is an N×N matrix, and N is a natural number. As an example, 32×32 indicates a largest decoding unit in universal video coding. Therefore, a size of the maximum decoding unit is 32×32.

It can be understood that when the maximum decoding unit is further increased, the number of the row storage components 110, the number of the column storage components 210, and the number of the diagonal storage components 310 are increased accordingly.

It can be understood that the coding unit and the coefficient coding block have a mapping relationship, and the decoding operation is an inverse operation of the coding operation. Therefore, the decoding unit and the coding unit have a mapping relationship, and the decoding unit and the coefficient coding block have a mapping relationship accordingly.

With reference to FIG. 1, the maximum decoding unit is an N×N matrix. Therefore, N row storage components 110 are provided, and each row storage component 110 corresponds to one ordinate of the maximum decoding unit.

Specifically, after the row storage circuit 100 receives a written-in address (the written-in address includes a written-in abscissa and a written-in ordinate) and written-in data (i.e. the coding coefficient obtained through entropy decoding) from a previous stage, the coding coefficient and the corresponding written-in abscissa are stored in the row storage circuit 100, and further stored in the corresponding row storage component 110 according to the written-in ordinate. Therefore, each row storage component 110 stores the coding coefficient under the corresponding written-in ordinate.

Moreover, the abscissa of the stored coding coefficient in the coefficient coding block is also stored in the corresponding row storage component 110. Therefore, when entropy decoding is performed on the target point currently to be decoded subsequently, calculation may be performed based on a difference between the abscissa of the target point and the abscissa of the stored coding coefficient in the row storage component 110. Therefore, whether the coding coefficient stored in the row storage component 110 is the coding coefficient required for entropy decoding on the target point is determined.

Correspondingly, reading of the row storage component 110 is controlled by an input reading ordinate. When entropy decoding is performed on the target point currently to be decoded in the coefficient coding block, after reading coordinates corresponding to the target point are determined, the corresponding row storage component 110 may be found according to the input reading ordinate. Therefore, several coding coefficients adjacent in the row direction and having the same reading ordinate are searched for according to the reading abscissa as reference coefficients in the row direction.

In the embodiment, each row storage component 110 includes: a first row storage component 111 configured to store a coding coefficient under a corresponding ordinate, and an abscissa of the stored coding coefficient in the coefficient coding block, where the coding coefficient stored in the first row storage component 111 is taken as a first latest coding coefficient; and a second row storage component 112 configured to store a first next latest coding coefficient obtained by performing saturation processing on the first latest coding coefficient currently stored in the first row storage component 111, and an abscissa corresponding to the first next latest coding coefficient in a case that the first row storage component 111 updates and stores the coding coefficient, where the saturation processing is configured to enable a bit width of the first next latest coding coefficient to equal a preset bit number required by a reference point next adjacent to the target point in the row direction, and the target point is a position point currently to be decoded in the coefficient coding block.

The row storage component 110 includes the first row storage component 111 and the second row storage component 112 corresponding to the first row storage component 111, so that the first latest coding coefficient in the row storage component 110 is stored with a complete bit width, and the first next latest coding coefficient is stored with a bit width obtained after the saturation processing.

In an embodiment, according to an actual calculation method, when entropy decoding is performed on the target point currently to be decoded in the coefficient coding block, coding coefficients of five reference points around the target point are required for calculation. The five reference points are a reference point most adjacent to the target point in the row direction, the reference point next adjacent to the target point in the row direction, a reference point most adjacent to the target point in the column direction, the reference point next adjacent to the target point in the column direction, and a reference point most adjacent to the target point in the diagonal direction respectively.

Specifically, entropy decoding is performed on the coefficient coding block through scanning. With three times of entropy decoding as an example, in a scanning order, a coding coefficient obtained through first entropy decoding is stored in the first row storage component 111, and after second entropy decoding is performed, a coding coefficient obtained through second entropy decoding is stored in the first row storage component 111. In this case, the coding coefficient stored in the first row storage component 111 after first entropy decoding becomes an old value and is overwritten, and the old value is stored in the second row storage component 112 after undergoing saturation processing, and the coding coefficient stored in the first row storage component 111 after second entropy decoding becomes a new value. Therefore, based on entropy decoding and a setting mode of the row storage component 110, it indicates that for a target point corresponding to third entropy decoding, the first latest coding coefficient currently stored in the first row storage component 111 may be the coding coefficient of a closest point (i.e. a position point most adjacent), a next closest point (i.e. a position point next adjacent), or a farther position point of the target point in the row direction, while the first next latest coding coefficient currently stored in the second row storage component 112 may be the coding coefficient of the next closest point or a farther position point, instead of the coding coefficient of the closest point.

Therefore, the row storage component 110 includes the first row storage component 111 and the second row storage component 112. When entropy decoding is performed on one target point, the first row storage component 111 is configured to output the coding coefficient of the reference point most adjacent to the target point in the row direction, and the second row storage component 112 is configured to output the coding coefficient of the reference point next adjacent to the target point in the row direction, so that the calculation requirement of entropy decoding is satisfied. The most adjacent in the row direction indicates that a difference from the abscissa of the target point is 1. The next adjacent in the row direction indicates that a difference from the abscissa of the target point is 2.

With the first row storage component 111 and the second row storage component 112 arranged, it is possible to simultaneously output the coding coefficient of the reference point most adjacent to the target point in the row direction and the coding coefficient of the reference point next adjacent to the target point in the row direction, so that the speed of entropy decoding is increased.

Secondly, when entropy decoding is performed, the preset bit number required by the reference point next adjacent in the row direction is small. Moreover, after the written-in data of the row storage circuit 100 are obtained, the coding coefficient in the written-in data is written in the first row storage component 111 and taken as the first latest coding coefficient. When the first row storage component 111 updates and stores the coding coefficient (in other words, when a new coding coefficient is written in), the first latest coding coefficient (i.e. the old value) currently stored in the first row storage component 111 is overwritten with the coding coefficient newly written-in. Therefore, by performing saturation processing on the first latest coding coefficient in the first row storage component 111 and storing the first next latest coding coefficient obtained by performing the saturation processing on the first latest coding coefficient, a data bit width of the first next latest coding coefficient is reduced, so that a storage space is saved on.

Moreover, in the second row storage component 112, the bit width of the first next latest coding coefficient equals the preset bit number required by the reference point next adjacent to the target point in the row direction. Therefore, no effect is generated on the entropy decoding calculation while the storage space is saved on as much as possible.

It can be understood that the abscissa corresponding to the first next latest coding coefficient is the abscissa corresponding to the first latest coding coefficient.

It should be noted that according to an entropy decoding algorithm, the reference points most adjacent in the row direction and the column direction, the reference points next adjacent in the row direction and the column direction, and the reference point most adjacent in the diagonal direction each have a bit number required to satisfy the entropy decoding calculation.

In a specific embodiment, the bit number required by the reference points most adjacent in the row direction and the column direction is 15 bits, the preset bit number required by the reference points next adjacent in the row direction and the column direction is 6 bits, and the preset bit number required by the reference point most adjacent in the diagonal direction is 6 bits.

It should also be noted that the reference point most adjacent in the row direction and the reference point most adjacent in the column direction are positioned on the same diagonal position line. The reference point next adjacent in the row direction, the reference point next adjacent in the column direction, and the reference point most adjacent in the diagonal direction are positioned on the same diagonal position line.

As an example, the coding coefficient obtained through entropy decoding is the absolute value of the coefficient, the bit width of the coding coefficient obtained through entropy decoding is 15 bits, and the bit width of the written-in abscissa is 5 bits. 20-bit data obtained by combining the coding coefficient and the written-in abscissa is stored in the first row storage component 111 of the corresponding row storage component 110.

Correspondingly, in the embodiment, in the first row storage component 111, the bit width of the first latest coding coefficient is 15 bits.

Specifically, with one row storage component 110 as an example, when the first row storage component 111 updates and stores the coding coefficient (in other words, when a latest coding coefficient is written in), saturation processing is performed on the first latest coding coefficient (i.e. the old value stored in the first row storage component 111) currently stored in the first row storage component 111. Therefore, the first next latest coding coefficient having the bit width reduced and the corresponding abscissa are stored in the second row storage component 112 of the same row storage component 110.

As an example, in the second row storage component 112, the bit width of the first next latest coding coefficient is 6 bits. Correspondingly, after saturation processing is performed on the first latest coding coefficient in the first row storage component 111, 11-bit data obtained by combining the first next latest coding coefficient and the written-in abscissa is stored in the second row storage component 112 of the corresponding row storage component 110.

Specifically, in a case that the bit width of the coding coefficient obtained through entropy decoding is j bits, if (j−k) highest bits in the coding coefficient are 0, k lowest bits in the first next latest coding coefficient are identical to k lowest bits in the first latest coding coefficient; and if not, a lowest bit in the first next latest coding coefficient is identical to a lowest bit in the first latest coding coefficient, and (k−1) remaining bits are 1. Specifically, k denotes the preset bit number required by the reference point next adjacent to the target point in the row direction.

With the bit width of the first latest coding coefficient being 15 bits and the preset bit number required by the reference point next adjacent to the target point in the row direction being 6 bits as an example, if 9 highest bits in the coding coefficient (i.e. the first latest coding coefficient in the first row storage component 111) are 0, the bit width of the first next latest coding coefficient is 6 bits; 6 lowest bits in the first next latest coding coefficient are identical to 6 lowest bits in the first latest coding coefficient; and otherwise, the lowest bit in the first next latest coding coefficient is identical to the lowest bit in the first latest coding coefficient, and 5 remaining bits are 1.

It should be noted that since the lowest bit in the first next latest coding coefficient is reserved all the time, the parity of the lowest bit in the first next latest coding coefficient is not changed, and no effect is generated on subsequent calculation based on the parity of the bit.

Correspondingly, reading of the first row storage component 111 and the second row storage component 112 is controlled by the input reading ordinate. After the reading coordinates corresponding to the target point are determined, the corresponding row storage component 110 may be found according to the input reading ordinate. Therefore, the first latest coding coefficient written in the row corresponding to the reading ordinate may be output by the first row storage component 111, and the first next latest coding coefficient written in the row corresponding to the reading ordinate may be output by the second row storage component 112.

For example, as shown in FIG. 1, the coding coefficient output by the first row storage component 111 is a row output coefficient 1, and the coding coefficient output by the second row storage component 112 is a row output coefficient 2.

With reference to FIG. 2, the maximum decoding unit is an N×N matrix. Therefore, N column storage components 210 are provided, and each column storage component 210 corresponds to one written-in abscissa of the maximum decoding unit.

Specifically, after the column storage circuit 200 receives a written-in address (the written-in address includes a written-in abscissa and a written-in ordinate) and written-in data from a previous stage, the coding coefficient and the corresponding written-in ordinate are stored in the column storage circuit 200, and further stored in the corresponding column storage component 210 according to the written-in ordinate. Therefore, each column storage component 210 stores the coding coefficient under the corresponding written-in abscissa.

Moreover, the ordinate of the stored coding coefficient in the coefficient coding block is also stored in the corresponding column storage component 210. Therefore, when entropy decoding is performed on the target point currently to be decoded subsequently, calculation may be performed based on a difference between the ordinate of the target point and the ordinate of the coding coefficient stored in the column storage component 210. Therefore, whether the coding coefficient stored in the column storage component 210 is the coding coefficient required for entropy decoding on the target point is determined.

Correspondingly, reading of the column storage component 210 is controlled by an input reading abscissa. When entropy decoding is performed on the target point currently to be decoded in the coefficient coding block, after reading coordinates corresponding to the target point are determined, the corresponding column storage component 210 may be found according to the input reading abscissa. Therefore, several coding coefficients adjacent in the column direction and having the same reading abscissa are searched for according to the reading ordinate as reference coefficients in the column direction.

In the embodiment, each column storage component 210 includes: a first column storage component 211 configured to store a coding coefficient under a corresponding abscissa, and an ordinate of the stored coding coefficient in the coefficient coding block, where the coding coefficient stored in the first column storage component 211 is taken as a second latest coding coefficient; and a second column storage component 212 configured to store a second next latest coding coefficient obtained by performing saturation processing on the second latest coding coefficient currently stored in the first column storage component 211, and an ordinate corresponding to the second next latest coding coefficient in a case that the first column storage component 211 updates and stores the coding coefficient, where the saturation processing is configured to enable a bit width of the second next latest coding coefficient to equal a preset bit number required by the reference point next adjacent to the target point in the column direction, and the target point is a position point currently to be decoded in the coefficient coding block.

The column storage component 210 includes the first column storage component 211 and the second column storage component 212 corresponding to the first column storage component 211. Therefore, the second latest coding coefficient in the column storage component 210 is stored with a complete bit width, and the second next latest coding coefficient is stored with a bit width obtained after the saturation processing.

It can be understood that the ordinate corresponding to the second next latest coding coefficient is the ordinate corresponding to the second latest coding coefficient.

According to an actual calculation method, when entropy decoding is performed on the target point currently to be decoded in the coefficient coding block, coding coefficients of five reference points around the target point are required for calculation.

When entropy decoding is performed on one target point, the first column storage component 211 is configured to output the coding coefficient of the reference point most adjacent to the target point in the column direction, and the second column storage component 212 is configured to output the coding coefficient of the reference point next adjacent to the target point in the column direction. The most adjacent in the column direction herein indicates that a difference from the ordinate of the target point is 1. The next adjacent in the column direction indicates that a difference from the ordinate of the target point is 2.

Firstly, with the first column storage component 211 and the second column storage component 212 arranged, it is possible to simultaneously output the coding coefficient of the reference point most adjacent to the target point in the column direction and the coding coefficient of the reference point next adjacent to the target point in the column direction, so that the speed of entropy decoding is increased.

Secondly, when entropy decoding is performed, the preset bit number required by the reference point next adjacent in the column direction is small. Moreover, after the written-in data of the row storage circuit 100 are obtained, the coding coefficient in the written-in data is written in the first column storage component 211 and taken as the second latest coding coefficient. When the first column storage component 211 updates and stores the coding coefficient (in other words, when a new coding coefficient is written in), the second latest coding coefficient (i.e. the old value) currently stored in the first column storage component 211 is overwritten with the coding coefficient newly written-in. Therefore, by performing saturation processing on the second latest coding coefficient in the first column storage component 211 and storing the second next latest coding coefficient obtained by performing the saturation processing on the second latest coding coefficient, a data bit width of the second next latest coding coefficient is reduced, so that a storage space is saved on.

Moreover, in the second column storage component 212, the bit width of the second next latest coding coefficient equals the preset bit number required by the reference point next adjacent to the target point in the column direction. Therefore, no effect is generated on entropy decoding calculation while the storage space is saved on as much as possible.

Reference may be made to the related description of the row storage component 210 for the analysis of the reason why the column storage component 210 includes the first column storage component 211 and the second column storage component 212, which is similar with that of the row storage component 210, and will not be repeated.

As an example, the coding coefficient obtained through entropy decoding is the absolute value of the coefficient, the bit width of the coding coefficient is 15 bits, and the bit width of the written-in ordinate is 5 bits. 20-bit data obtained by combining the coding coefficient and the written-in ordinate is stored in the first column storage component 211 of the corresponding column storage component 210.

Correspondingly, in the embodiment, in the first column storage component 211, the bit width of the second latest coding coefficient is 15 bits.

Specifically, with one column storage component 210 as an example, when the first column storage component 211 updates and stores the coding coefficient (in other words, when a latest coding coefficient is written in), saturation processing is performed on the second latest coding coefficient (i.e. the old value stored in the first column storage component 211) currently stored in the first column storage component 211. Therefore, the second next latest coding coefficient having the bit width reduced and the corresponding ordinate are stored in the second column storage component 212 of the same column storage component 210. As an example, the preset bit number required by the reference point next adjacent to the target point in the column direction is 6 bits. Therefore, in the second column storage component 212, the bit width of the second next latest coding coefficient is 6 bits. Correspondingly, after saturation processing is performed on the second latest coding coefficient in the first column storage component 211, 11-bit data obtained by combining the second next latest coding coefficient and the written-in ordinate is stored in the second column storage component 212 of the corresponding column storage component 210.

Specifically, in a case that the bit width of the coding coefficient obtained through entropy decoding is j bits, if (j–k) highest bits in the coding coefficient are 0, k lowest bits in the second next latest coding coefficient are identical to k lowest bits in the second latest coding coefficient; and if not, a lowest bit in the second next latest coding coefficient is identical to a lowest bit in the second latest coding coefficient, and (k–1) remaining bits are 1. Specifically, k denotes the preset bit number required by the reference point next adjacent to the target point in the column direction.

Reference may be made to the description of the first next latest coding coefficient in the second row storage component 112 for the description of the second next latest coding coefficient, which will not be repeated herein.

It should be noted that according to the relevant algorithm in versatile video coding, saturation processing is performed on the latest coding coefficient in the embodiment. Therefore, the entropy decoding calculation dependent on the absolute value of the surrounding coding coefficient in versatile video coding may still be satisfied, without changing a final parameter calculation result.

Correspondingly, reading of the first column storage component 211 and the second column storage component 212 is controlled by an input reading abscissa. After reading coordinates corresponding to the target point are determined, the corresponding column storage component 210 may be found according to the input reading abscissa. Therefore, the second latest coding coefficient written in the column corresponding to the reading abscissa may be output by the first column storage component 211, and the second next latest coding coefficient written in the column corresponding to the reading abscissa is output by the second column storage component 212. For example, as shown in FIG. 2, the coding coefficient output by the first column storage component 211 is a column output coefficient 1, and the coding coefficient output by the second column storage component 212 is a column output coefficient 2.

Since the decoding unit is a matrix, in the diagonal direction, the number of the diagonal position lines equals 1 subtracted from the sum of the number of rows and the number of columns of the decoding unit, and the diagonal storage components 310 correspond one-to-one to the diagonal position lines of the decoding unit.

With reference to FIG. 3, the maximum decoding unit is an N×N matrix. Therefore, 2N-1 diagonal storage components 310 are provided.

Specifically, after the diagonal storage circuit 300 receives a written-in address (the written-in address includes a written-in abscissa and a written-in ordinate) and written-in data from a previous stage, the coding coefficient and the corresponding written-in abscissa or the written-in ordinate are stored in the diagonal storage circuit 300, and written-in diagonal coordinates are obtained according to the written-in abscissa and the written-in ordinate. The diagonal coordinates are configured to indicate the diagonal storage component 310 corresponding to the diagonal position line, in which the data are written, so that the data are stored in the corresponding diagonal storage component 310 according to the written-in diagonal coordinates. Therefore, each diagonal storage component 310 stores the coding coefficient on the corresponding diagonal position line.

Moreover, the abscissa or the ordinate of the stored coding coefficient in the coefficient coding block is also stored in the corresponding diagonal storage component 310. Therefore, when entropy decoding is performed on the target point currently to be decoded subsequently, calculation may be performed based on a difference between the abscissa of the target point and the abscissa of the coding coefficient stored in the row storage component 110, and alternatively, calculation may be performed based on a difference between the ordinate of the target point and the ordinate of the coding coefficient stored in the row storage component 110. Therefore, whether the coding coefficient stored in the diagonal storage component 310 is the coding coefficient required for entropy decoding on the target point is determined.

Correspondingly, reading of the diagonal storage component 310 is controlled by an input reading abscissa and reading ordinate. When entropy decoding is performed on the target point currently to be decoded in the coefficient coding block, after reading coordinates corresponding to the target point are determined, the corresponding diagonal storage component 310 may be found according to the input reading abscissa or reading ordinate. Therefore, several coding coefficients adjacent in the diagonal direction and having preset coordinate offset are searched for according to the reading abscissa or the reading ordinate as reference coefficients in the diagonal direction.

For example, as shown in FIG. 3, the coding coefficient output by the diagonal storage component 310 is a diagonal coefficient output.

It should be noted that for the same diagonal position line, after any one of the abscissa and the ordinate is determined, the other one can be obtained. Therefore, only one of the written-in abscissa and the written-in ordinate is required to be stored in the diagonal storage circuit 300, so that a storage space is saved on.

In the embodiment, the diagonal storage component 310 corresponding to the coding coefficient is determined based on an expression (N–1)–X+Y, and in other words, the diagonal coordinates are obtained according to the expression (N–1)–X+Y, where N denotes a maximum of the number of rows and the number of columns of the decoding unit, X denotes the abscissa of the coding coefficient in the coefficient coding block, and Y denotes the ordinate of the coding coefficient in the coefficient coding block.

In the embodiment, the diagonal storage component 310 is configured to store a third latest coding coefficient obtained by performing saturation processing on the coding coefficient, where a bit width of the third latest coding coefficient equals a preset bit number required by the reference point most adjacent to the target point in the diagonal direction, and the target point is a position point currently to be decoded in the coefficient coding block.

It should be noted that according to the relevant algorithm in versatile video coding, when entropy decoding is performed, the preset bit number required by the reference point most adjacent in the diagonal direction is small. Therefore, saturation processing is performed on the coding coefficient obtained through previous entropy decoding, and the third latest coding coefficient obtained by performing the saturation processing on the coding coefficient is stored in the diagonal storage component 310. Accordingly, a data bit width of the third latest coding coefficient is reduced, so that the storage space is saved on.

The bit width of the third latest coding coefficient stored in the diagonal storage component 310 equals the preset bit number required by the reference point most adjacent to the target point in the diagonal direction. Therefore, the entropy decoding calculation dependent on the absolute value of the surrounding coding coefficient in versatile video coding may still be satisfied, without changing a subsequent entropy decoding calculation result.

It should also be noted that based on a parameter calculation method of versatile video coding, for any target point, calculation is performed depending on the coding coefficient of an adjacent position in the diagonal direction, and in other words, only one coding coefficient most adjacent in the diagonal direction (for example, an adjacent coding coefficient on the upper left corner of the target point) is required. Therefore, the diagonal storage component 310 is configured to store the third latest coding coefficient, instead of the next latest coding coefficient obtained through saturation processing.

As an example, the preset bit number required by the reference point most adjacent to the target point in the diagonal direction is 6 bits. Therefore, in the diagonal storage component 310, the bit width of the third latest coding coefficient is 6 bits.

Therefore, the bit width of the third latest coding coefficient stored in the diagonal storage component 310 is 6 bits, and the bit width of the written-in abscissa or the written-in ordinate is 5 bits. 11-bit data obtained by combining the third latest coding coefficient and the written-in abscissa are stored in the corresponding diagonal storage component 310, and alternatively, 11-bit data obtained by combining the third latest coding coefficient and the written-in ordinate are stored in the corresponding diagonal storage component 310.

It should be noted that in the embodiment, the written-in abscissa and the reading abscissa are configured to denote a coordinate in a written-in state and a coordinate in a reading state respectively. Similarly, the written-in ordinate and the reading ordinate are configured to denote an ordinate in the written-in state and an ordinate in the reading state respectively. The written-in abscissa is configured to indicate the column in which the written-in data are written, and the written-in ordinate is configured to indicate the row in which the written-in data are written.

It should also be noted that if one vertex of the coefficient coding block is taken as a coordinate origin, one diagonal position line is a diagonal passing through the coordinate origin, an abscissa and an ordinate of a coding coefficient positioned on the diagonal line are identical to each other, and remaining diagonal position lines are lines parallel to the diagonal passing through the coordinate origin.

The coding coefficient is obtained based on the versatile video coding standard. In versatile video coding, for a particular target point, the entropy decoding calculation is performed based on absolute values of coding coefficients at adjacent positions around the particular target point. Therefore, each coding coefficient under the same ordinate may be stored in the same row storage component 110, each coding coefficient under the same abscissa may be stored in the same column storage component 210, and each coding coefficient positioned on the same diagonal position line may be stored in the same diagonal storage component 310. Therefore, the memory structure can be compatible with entropy decoding in versatile video coding.

In the embodiment, the memory structure is a flip flop structure, and in other words, the storage components in the row storage circuit 100, the column storage circuit 200, and the diagonal storage circuit 300 are registers. Accordingly, a number of the registers is reduced through the memory structure in the embodiment.

For example, if the solution of the storage array having the same layout as the maximum decoding unit is employed, for the maximum decoding unit of 32×32, the registers required each occupy 16 K bits. While with the memory structure in the embodiment employed, in a case of including the row storage circuit 100 composed of the first row storage component 111 and the second row storage component 112, the column storage circuit 200 composed of the first column storage component 211 and the second column storage component 212, and the diagonal storage circuit 300 composed of the diagonal storage components 310, in consideration of the written-in address data stored, the number of the registers can be reduced to 2677 bits and can be reduced to 16.7% of that of the existing solution of the storage array, and the parameter calculation based on the absolute value of the surrounding coding coefficients is satisfied.

In addition, since the registers have a higher response speed, data in different registers can be read simultaneously. Therefore, the speed of entropy decoding can be increased, so as to satisfy the speed requirement of video decoding while the occupied area of the memory structure is reduced.

In other embodiments, the memory structure may alternatively be an SRAM device structure. With the solution in the embodiment of the disclosure employed, the occupied area of the memory structure is reduced.

Correspondingly, a coefficient storage method using the foregoing memory structure is further provided in the embodiments of the disclosure. The coefficient storage method is configured to store a coding coefficient, obtained through entropy decoding, in a coefficient coding block.

With reference to FIG. 4, FIG. 4 is a schematic flowchart of an embodiment of a coefficient storage method of the disclosure.

In conjunction with FIG. 1, S01 that the coding coefficient and an abscissa of the coding coefficient in the coefficient coding block are stored in a corresponding row storage component 110 based on an ordinate of the coding coefficient in the coefficient coding block is executed.

By storing the coding coefficient in the row storage component 110, the entropy decoding calculation of a target point is performed subsequently by searching for coding coefficients of several position points continuously adjacent to the target point in a row direction from the row storage component 110. The target point herein is a position point currently to be decoded in the coefficient coding block.

As shown in FIG. 1, N row storage component 110 are provided, and each row storage component 110 corresponds to one ordinate of a maximum decoding unit. Therefore, the row storage component 110 in which the coding coefficient is stored may be determined in a case of determining the ordinate of the coding coefficient.

Specifically, after the row storage circuit 100 receives a written-in address (the written-in address includes a written-in abscissa and a written-in ordinate) and written-in data from a previous stage, the coding coefficient and the corresponding written-in abscissa are stored in the row storage circuit 100, and further stored in the corresponding row storage component 110 based on the written-in ordinate of the coding coefficient.

It should be noted that the written-in abscissa and the written-in ordinate are configured to denote an abscissa and an ordinate in a written-in state respectively. The written-in abscissa of the coding coefficient is the abscissa of the coding coefficient in the corresponding coefficient coding block, and the written-in ordinate of the coding coefficient is the ordinate of the coding coefficient in the corresponding coefficient coding block.

As an example, the coding coefficient obtained through entropy decoding is an absolute value of the coefficient. Therefore, a bit width of the stored coding coefficient is 15 bits, and a bit width of the written-in abscissa is 5 bits. 20-bit data obtained by combining the coding coefficient and the written-in abscissa is stored in the corresponding row storage component 110.

In the embodiment, each row storage component 110 includes a first row storage component 111 and a second row storage component 112. Therefore, the step that the coding coefficient and an abscissa of the coding coefficient in the coefficient coding block are stored in a corresponding row storage component 110 includes: the coding coefficient and the abscissa of the coding coefficient in the coefficient coding block are stored in the first row storage component 111 of the corresponding row storage component 110 based on the ordinate of the coding coefficient in the coefficient coding block, where the coding coefficient stored in the first row storage component 111 is taken as a first latest coding coefficient; and a first next latest coding coefficient obtained by performing saturation processing on the first latest coding coefficient currently stored in the first row storage component 111, and an abscissa corresponding to the first next latest coding coefficient are stored in the second corresponding row storage component 112 in a case that a next coding coefficient is stored in the first row storage component 111, where the saturation processing is configured to enable a bit width of the first next latest coding coefficient to equal a preset bit number required by a reference point next adjacent to a target point in the row direction, and the target point is a position point currently to be decoded in the coefficient coding block.

In other words, the step that the coding coefficient and an abscissa of the coding coefficient in the coefficient coding block are stored in a corresponding row storage component 110 further includes: saturation processing is performed on the first latest coding coefficient currently stored in the first row storage component 111, so as to obtain the first next latest coding coefficient in a case that the next coding coefficient is stored in the first row storage component 111.

Correspondingly, after the saturation processing is performed on the first latest coding coefficient, the first next latest coding coefficient and the abscissa of the first next latest coding coefficient are stored in the second row storage component 112.

The coding coefficient obtained through a latest entropy decoding operation is stored in the first row storage component 111 first, and the coding coefficient obtained through a previous entropy decoding operation is stored in the second row storage component 112 after undergoing saturation processing. When next entropy decoding is performed, the first row storage component 111 is configured to output a coding coefficient of a reference point most adjacent to the target point in the row direction, and the second row storage component 112 is configured to output a coding coefficient of a reference point next adjacent to the target point in the row direction, so that the requirement of entropy decoding calculation is satisfied.

When entropy decoding is performed, when the first row storage component 111 updates and stores the coding coefficient (in other words, when a new coding coefficient is written in), the first latest coding coefficient (i.e. an old value) currently stored in the first row storage component 111 is overwritten with the coding coefficient newly written-in. Moreover, a preset bit number required by the reference point next adjacent in the row direction is small. Therefore, by performing the saturation processing on the first latest coding coefficient in the first row storage component 111 and storing the first next latest coding coefficient obtained by performing the saturation processing on the first latest coding coefficient, a data bit width of the first next latest coding coefficient is reduced, so that a storage space is saved on.

Moreover, in the second row storage component 112, the bit width of the first next latest coding coefficient equals the preset bit number required by the reference point next adjacent to the target point in the row direction. Therefore, no effect is generated on the entropy decoding calculation while the storage space is saved on as much as possible.

It can be understood that the abscissa corresponding to the first next latest coding coefficient is the abscissa corresponding to the first latest coding coefficient.

It should be noted that according to an entropy decoding algorithm, the reference points most adjacent in the row direction and the column direction, the reference points next adjacent in the row direction and the column direction, and the reference point most adjacent in the diagonal direction each have a bit number required to satisfy the entropy decoding calculation.

In a specific embodiment, the bit number required by the reference points most adjacent in the row direction and the column direction is 15 bits, the preset bit number required by the reference points next adjacent in the row direction and the column direction is 6 bits, and the preset bit number required by the reference point most adjacent in the diagonal direction is 6 bits.

It should also be noted that the reference point most adjacent in the row direction and the reference point most adjacent in the column direction are positioned on the same diagonal position line. The reference point next adjacent in the row direction, the reference point next adjacent in the column direction, and the reference point most adjacent in the diagonal direction are positioned on the same diagonal position line.

As an example, the 20-bit data obtained by combining the coding coefficient and the written-in abscissa is stored in the first row storage component 111 of the corresponding row storage component 110. Correspondingly, in the first row storage component 111, the bit width of the first latest coding coefficient is 15 bits.

Specifically, a bit width of the coding coefficient obtained through entropy decoding is j bits; and the saturation processing includes: whether (j–k) highest bits in the coding coefficient are 0 is determined; if yes, k lowest bits in the coding coefficient are reserved; and if no, only a lowest bit in the coding coefficient is reserved, and (k–1) remaining bits are filled with 1; where k denotes the preset bit number required by the reference point next adjacent to the target point in the row direction.

It should be noted that the coding coefficient obtained through entropy decoding is the first latest coding coefficient stored in the first row storage component 111.

As an example, in the step that saturation processing is performed on the first latest coding coefficient, the bit width of the first next latest coding coefficient is 6 bits.

Correspondingly, with the bit width of the coding coefficient obtained through entropy decoding being 15 bits, and the preset bit number required by the reference point next adjacent to the target point in the row direction being 6 bits as an example, in the step that saturation processing is performed, whether 9 highest bits in the coding coefficient are 0 is determined; if yes, 6 lowest bits in the coding coefficient are reserved; and if no, only a lowest bit in the coding coefficient is reserved, and 5 remaining bits are filled with 1.

Correspondingly, after the saturation processing is performed on the first latest coding coefficient in the first row storage component 111, 11-bit data obtained by combining the first next latest coding coefficient and the written-in abscissa is stored in the second row storage component 112 of the corresponding row storage component 110.

It should be noted that since a lowest bit in the first next latest coding coefficient is reserved all the time, the parity of the lowest bit in the first next latest coding coefficient is not changed, and no effect is generated on subsequent calculation based on the parity of the bit.

In conjunction with FIG. 2, S02 that the coding coefficient and the ordinate of the coding coefficient in the coefficient coding block are stored in a corresponding column storage component 210 based on the abscissa of the coding coefficient in the coefficient coding block is executed.

By storing the coding coefficient in the column storage component 210, the entropy decoding calculation is performed on the target point subsequently by searching for coding coefficients of several position points continuously adjacent to the target point in the column direction from the column storage component 210.

As shown in FIG. 2, N column storage components 210 are provided, and each column storage component 210 corresponds to one written-in abscissa of the maximum decoding unit. Therefore, the column storage component 210 in which the coding coefficient is stored may be determined in a case of determining the abscissa of the coding coefficient.

Specifically, after the column storage circuit 200 receives a written-in address (the written-in address includes a written-in abscissa and a written-in ordinate) and written-in data from a previous stage, the coding coefficient and the corresponding written-in ordinate are stored in the column storage circuit 200, and further stored in the corresponding column storage component 210 based on the written-in ordinate of the coding coefficient.

As an example, the bit width of the stored coding coefficient is 15 bits, and a bit width of the written-in ordinate is 5 bits. The 20-bit data obtained by combining the coding coefficient and the written-in ordinate is stored in the corresponding column storage component 210.

In the embodiment, each column storage component 210 includes a first column storage component 211 and a second column storage component 212. Therefore, the step that the coding coefficient and an ordinate of the coding coefficient in the coefficient coding block are stored in a corresponding column storage component 210 includes: the coding coefficient and the ordinate of the coding coefficient in the coefficient coding block are stored in the first column storage component 211 of the corresponding column storage component 210 based on the abscissa of the coding coefficient in the coefficient coding block, where the coding coefficient stored in the first column storage component 211 is taken as a second latest coding coefficient; and a second next latest coding coefficient obtained by performing saturation processing on the second latest coding coefficient currently stored in the first column storage component 211, and an ordinate corresponding to the second next latest coding coefficient are stored in the second corresponding column storage component 212 in a case that a next coding coefficient is stored in the first column storage component 211, where the saturation processing is configured to enable a bit width of the second next latest coding coefficient to equal a preset bit number required by the reference point next adjacent to the target point in the column direction, and the target point is a position point currently to be decoded in the coefficient coding block.

In other words, the step that the coding coefficient and the ordinate of the coding coefficient in the coefficient coding block are stored in a corresponding column storage component 210 further includes: saturation processing is performed on the second latest coding coefficient currently stored in the first column storage component 211, so as to obtain the second next latest coding coefficient in a case that the next coding coefficient is stored in the first column storage component 211.

Correspondingly, after the saturation processing is performed on the second latest coding coefficient, the second next latest coding coefficient and the ordinate of the second next latest coding coefficient are stored in the second column storage component 212.

The coding coefficient obtained through a latest entropy decoding operation is stored in the first column storage component 211 first, and the coding coefficient obtained through a previous entropy decoding operation is stored in the second column storage component 212 after undergoing saturation processing. When next entropy decoding is performed, the first column storage component 211 is configured to output a coding coefficient of the reference point most adjacent to the target point in the column direction, and the second column storage component 212 is configured to output a coding coefficient of the reference point next adjacent to the target point in the column direction, so that the requirement of the entropy decoding calculation is satisfied.

Correspondingly, saturation processing is performed on the second latest coding coefficient currently stored in the first column storage component 211 in a case that the next coding coefficient is stored in the first column storage component 211.

Moreover, in the second column storage component 212, the bit width of the second next latest coding coefficient equals the preset bit number required by the reference point next adjacent to the target point in the column direction. Therefore, no effect is generated on the entropy decoding calculation while the storage space is saved on as much as possible.

It can be understood that the ordinate corresponding to the second next latest coding coefficient is the ordinate corresponding to the second latest coding coefficient.

Specifically, with one column storage component 210 as an example, when a latest coding coefficient is written in the first column storage component 211, saturation processing is performed on an old value (i.e. the second latest coding coefficient written in previously) stored in the first column storage component. Therefore, the second next latest coding coefficient having the bit width reduced and the corresponding ordinate are stored in the second column storage component 212 of the same column storage component 210.

As an example, in the step that saturation processing is performed on the second latest coding coefficient, the bit width of the second next latest coding coefficient is 6 bits.

Correspondingly, after the saturation processing is performed on the second latest coding coefficient in the first column storage component 211, 11-bit data obtained by combining the second next latest coding coefficient and the written-in ordinate are stored in the second column storage component 212 of the corresponding column storage component 210.

Reference may be made to the relevant description of the step that saturation processing is performed on the first latest coding coefficient in the first row storage component 111 for the specific description of a method for performing saturation processing on the second latest coding coefficient in the first column storage component 211, which will not be repeated herein.

In conjunction with FIG. 3, S03 that the coding coefficient and the abscissa or the ordinate of the coding coefficient in the coefficient coding block are stored in a corresponding diagonal storage component 310 based on a diagonal position line on which the coding coefficient is positioned is executed.

By storing the coding coefficient in the diagonal storage component 310, entropy decoding calculation is performed on the target point subsequently by searching for coding coefficients of several position points continuously adjacent to the target point in the column direction from the diagonal storage component 310.

As shown in FIG. 3, 2N-1 diagonal storage components 310 are provided, and each diagonal storage component 310 corresponds to one diagonal position line of the maximum decoding unit. Therefore, the diagonal storage component 310 in which the coding coefficient is stored may be determined in a case of determining the abscissa and the ordinate of the coding coefficient.

Specifically, after the diagonal storage circuit 300 receives a written-in address (the written-in address includes a written-in abscissa and a written-in ordinate) and written-in data from a previous stage, the coding coefficient and the corresponding written-in abscissa or written-in ordinate are stored in the diagonal storage circuit 300, and written-in diagonal ordinates are obtained according to the written-in abscissa and the written-in ordinate. The diagonal ordinates are configured to indicate the diagonal storage component 310 corresponding to the diagonal position line, in which the data are written, so that the data are stored in the corresponding diagonal storage component 310 according to the written-in diagonal ordinates.

It should be noted that for the same diagonal position line, after any one of the abscissa and the ordinate is determined, the other one can be obtained. Therefore, only one of the written-in abscissa and the written-in ordinate is required to be stored in the diagonal storage circuit 300, so that a storage space is saved on.

In the embodiment, the step that the coding coefficient and the abscissa or the ordinate of the coding coefficient in the coefficient coding block are stored in a corresponding diagonal storage component 310 based on a diagonal position line on which the coding coefficient is positioned includes: the diagonal storage component corresponding to the coding coefficient is determined based on an expression (N–1)–X+Y, where N denotes a maximum of the number of rows and the number of columns of the decoding unit, X denotes the abscissa of the coding coefficient in the coefficient coding block, and Y denotes the ordinate of the coding coefficient in the coefficient coding block.

It should be noted that the step that the diagonal storage component corresponding to the coding coefficient is determined based on an expression (N–1)–X+Y indicates that diagonal coordinates are obtained based on the expression (N–1)–X+Y.

In the embodiment, before the step that the coding coefficient and the abscissa or the ordinate of the coding coefficient in the coefficient coding block are stored in a corresponding diagonal storage component 310, the method further includes: S04 that saturation processing is performed on the coding coefficient, so as to obtain a third latest coding coefficient, where the saturation processing is configured to enable a bit width of the third latest coding coefficient equals a preset bit number required by the reference point most adjacent to the target point in the diagonal direction, and the target point is a position point currently to be decoded in the coefficient coding block.

In the step that saturation processing is performed on the coding coefficient herein, the coding coefficient is the written-in data stored in the memory structure, i.e. the coding coefficient obtained through entropy decoding.

According to the relevant algorithm in versatile video coding, when entropy decoding is performed, a preset bit number required by the reference point most adjacent in the diagonal direction is small. Therefore, saturation processing is performed on the coding coefficient obtained through previous entropy decoding, and the third latest coding coefficient obtained by performing the saturation processing on the coding coefficient is stored in the diagonal storage component 310. Accordingly, a data bit width of the third latest coding coefficient is reduced, so that the storage space is saved on.

Moreover, the bit width of the third latest coding coefficient stored in the diagonal storage component 310 equals the preset bit number required by the reference point most adjacent to the target point in the diagonal direction. Therefore, the entropy decoding calculation dependent on the absolute value of the surrounding coding coefficient in versatile video coding may still be satisfied, without changing a subsequent entropy decoding calculation result.

Correspondingly, in the step that the coding coefficient and the abscissa or the ordinate of the coding coefficient in the coefficient coding block are stored in a corresponding diagonal storage component 310, the third latest coding coefficient is stored in the diagonal storage component 310.

It should be noted that based on a parameter calculation method of versatile video coding, for any target point, calculation is performed depending on the coding coefficient of an adjacent position in the diagonal direction, and in other words, only one coding coefficient most adjacent in the diagonal direction (for example, an adjacent coding coefficient on the upper left corner of the target point) is required. Therefore, the diagonal storage component 310 is configured to store the third latest coding coefficient, instead of the next latest coding coefficient obtained through saturation processing.

As an example, the preset bit number required by the reference point most adjacent to the target point in the diagonal direction is 6 bits. Therefore, in the diagonal storage component 310, the bit width of the third latest coding coefficient is 6 bits.

Therefore, the bit width of the third latest coding coefficient stored in the diagonal storage component 310 is 6 bits, and the bit width of the written-in abscissa or the written-in ordinate is 5 bits. 11-bit data obtained by combining the third latest coding coefficient and the written-in abscissa are stored in the corresponding diagonal storage component 310, and alternatively, 11-bit data obtained by combining the third latest coding coefficient and the written-in ordinate are stored in the corresponding diagonal storage component 310.

It should be noted that reference may be made to the relevant description in the foregoing embodiment for the specific description of the memory structure, which will not be repeated in the embodiment.

Correspondingly, an entropy decoding method is further provided in the embodiments of the disclosure. The entropy decoding method is performed based on a coding coefficient stored in the memory structure in the foregoing embodiment.

FIG. 5 is a schematic flowchart of an embodiment of an entropy decoding method of the disclosure.

With reference to FIG. 5, S101 that an abscissa and an ordinate of a target point in a coefficient coding block are determined, where the target point is a position point currently to be decoded in the coefficient coding block.

By determining the abscissa and the ordinate of the target point, coding coefficients of several reference points continuously adjacent in a row direction, coding coefficients of several reference points continuously adjacent in a column direction, and coding coefficients of several reference points continuously adjacent in a diagonal direction are searched for subsequently according to the abscissa and the ordinate of the target point.

For example, coordinates of the target point in the corresponding coefficient coding block are (X, Y).

With reference to FIG. 5 continuously, in conjunction with FIG. 1, S102 that a first search is performed from a row storage component 110 corresponding to the ordinate based on the abscissa and the ordinate corresponding to the target point, where the first search is configured to extract coding coefficients of several reference points continuously adjacent to the target point in the row direction as first reference coefficients.

For a particular target point, entropy decoding calculation is required to be performed based on absolute values of coding coefficients of adjacent positions around the target point. Therefore, the coding coefficients of several reference points continuously adjacent to the target point in the row direction are extracted to prepare for performing the entropy decoding calculation on the target point subsequently.

Specifically, reading of the row storage component 110 is controlled by an input reading ordinate. After reading coordinates (X, Y) corresponding to the target point are determined, the corresponding row storage component 110 may be found according to the input reading ordinate Y. Therefore, several coding coefficients adjacent in the row direction and having the same reading ordinate are searched for according to a reading abscissa as reference coefficients in the row direction.

As an example, based on the principle of the entropy decoding calculation, in the step that a first search is performed from a row storage component corresponding to the ordinate, the first search is configured to extract coding coefficients of two reference points continuously adjacent to the target point in the row direction.

With the first search being configured to search for two continuously adjacent reference points from the left of the target point as an example, if the row storage component 110 stores the two reference points continuously adjacent to the target point in the row direction, abscissas of the two reference points are X−1 and X−2 respectively.

In other embodiments, in a case that the first search is configured to search for two continuously adjacent reference points from the right of the target point, the abscissas of the two reference points may alternatively be X+1 and X+2 respectively.

In other words, a difference between the abscissa of the reference point most adjacent in the row direction and the abscissa of the target point is 1, and a difference between the abscissa of the reference point next adjacent in the row direction and the abscissa of the target point is 2.

The coding coefficients under the same ordinate are stored in the same row storage component 110, and data stored in the row storage component 110 include the abscissas of the coding coefficients. Therefore, whether the coding coefficients stored in the row storage component 110 are the coding coefficients required for entropy decoding on the target point is determined by comparing the abscissa of the target point with the abscissas of the coding coefficients stored in the row storage component 110.

In the embodiment, each row storage component 110 includes a first row storage component 111 and a second row storage component 112, where the first row storage component 111 is configured to store a coding coefficient under a corresponding ordinate, and an abscissa of the stored coding coefficient in the coefficient coding block, and the coding coefficient stored in the first row storage component 111 is taken as a first latest coding coefficient; and the second row storage component 112 is configured to store a first next latest coding coefficient obtained by performing saturation processing on the first latest coding coefficient currently stored in the first row storage component 111, and an abscissa corresponding to the first next latest coding coefficient in a case that the first row storage component 111 updates and stores the coding coefficient, where the saturation processing is configured to enable a bit width of the first next latest coding coefficient to equal a preset bit number required by a reference point next adjacent to a target point in the row direction, and the target point is a position point currently to be decoded in the coefficient coding block.

Reference may be made to the relevant description in the foregoing embodiment for the specific description of the first row storage component 111 and the second row storage component 112, which will not be repeated in the embodiment.

Correspondingly, the step that a first search is performed from a row storage component 110 corresponding to the ordinate includes: a first latest coding coefficient of a reference point most adjacent to the target point in the row direction is searched for as one first reference coefficient from the first row storage component 111 of the row storage component 110 corresponding to the ordinate; and a first next latest coding coefficient of a reference point next adjacent to the target point in the row direction is searched for as one first reference coefficient from the second row storage component 112 of the row storage component 110 corresponding to the ordinate.

With reference to FIG. 5 continuously, in conjunction with FIG. 2, S103 that a second search is performed from a column storage component 210 corresponding to the abscissa based on the abscissa and the ordinate corresponding to the target point, where the second search is configured to extract coding coefficients of several reference points continuously adjacent to the target point in the column direction as second reference coefficients.

The coding coefficients of several reference points continuously adjacent to the target point in the row direction are extracted to prepare for performing the entropy decoding calculation on the target point subsequently.

Specifically, reading of storage components of the column storage component 210 is controlled by an input reading abscissa. After the reading coordinates (X, Y) corresponding to the target point are determined, the corresponding column storage component 210 may be found according to the input reading abscissa X. Therefore, several coding coefficients adjacent in the column direction and having the same reading abscissa X are searched for according to a reading ordinate Y as reference coefficients in the column direction.

As an example, based on the principle of the entropy decoding calculation, in the step that a second search is performed from a column storage component corresponding to the abscissa, the second search is configured to extract coding coefficients of two reference points continuously adjacent to the target point in the column direction.

With the second search being configured to search for two second continuously adjacent reference points from a position above the target point as an example, if the column storage component 210 stores the two reference points continuously adjacent to the target point in the row direction, ordinates of the two reference points are Y+1 and Y+2 respectively.

In other embodiments, in a case that the second search is configured to search for two continuously adjacent reference points from a position below the target point, the ordinates of the two reference points may alternatively be Y−1 and Y−2 respectively.

In other words, a difference between the ordinate of the reference point most adjacent in the column direction and the ordinate of the target point is 1, and a difference between the ordinate of the reference point next adjacent in the column direction and the ordinate of the target point is 2.

The coding coefficients under the same abscissa are stored in the same column storage component 210, and data stored in the column storage component 210 include the ordinates of the coding coefficients. Therefore, whether the coding coefficients stored in the column storage component 210 are the coding coefficients required for entropy decoding on the target point is determined by comparing the ordinate of the target point with the ordinates of the coding coefficients stored in the column storage component 210.

In the embodiment, each column storage component 210 includes a first column storage component 211 and a second column storage component 212, where the first column storage component 211 is configured to store a coding coefficient under a corresponding abscissa, and an ordinate of the stored coding coefficient in the coefficient coding block, and the coding coefficient stored in the first column storage component 211 is taken as a second latest coding coefficient; and the second column storage component 212 is configured to store a second next latest coding coefficient obtained by performing saturation processing on the second latest coding coefficient currently stored in the first column storage component 211, and an ordinate corresponding to the second next latest coding coefficient in a case that the first column storage component 211 updates and stores the coding coefficient, where the saturation processing is configured to enable a bit width of the second next latest coding coefficient to equal a preset bit number required by the reference point next adjacent to the target point in the column direction, and the target point is a position point currently to be decoded in the coefficient coding block.

Reference may be made to the relevant description in the foregoing embodiment for the specific description of the first column storage component 211 and the second column storage component 212, which will not be repeated in the embodiment.

Correspondingly, the step that a second search is performed from a column storage component 210 corresponding to the abscissa includes: a second latest coding coefficient of the reference point most adjacent to the target point in the column direction is searched for as one second reference coefficient from the first column storage component 211 of the column storage component 210 corresponding to the abscissa; and a second next latest coding coefficient of the reference point next adjacent to the target point in the column direction is searched for as one second reference coefficient from the second column storage component 212 of the column storage component 210 corresponding to the abscissa.

With reference to FIG. 5 continuously, in conjunction with FIG. 3, S104 that a third search is performed from a diagonal storage component 310 corresponding to a diagonal position line on which the abscissa and the ordinate are positioned based on the abscissa and the ordinate corresponding to the target point, where the third search is configured to extract coding coefficients of several reference points continuously adjacent to the target point in the diagonal direction as third reference coefficients.

The coding coefficients of several reference points continuously adjacent to the target point in the diagonal direction are extracted to prepare for performing the entropy decoding calculation on the target point subsequently.

Specifically, reading of the diagonal storage component 310 is controlled by an input reading abscissa and reading ordinate. After the reading coordinates (X, Y) corresponding to the target point are determined, the corresponding diagonal storage component 310 may be found according to the input reading abscissa X and reading ordinate Y. Therefore, several coding coefficients continuously adjacent in the diagonal direction may be extracted according to the reading abscissa X or reading ordinate Y.

As an example, based on the principle of the entropy decoding calculation, in the step that a third search is performed from a diagonal storage component 310 corresponding to a diagonal position line on which the abscissa and the ordinate are positioned, the third search is configured to extract the coding coefficient of one reference point adjacent to the target point in the diagonal direction.

With the third search being configured to search for the most adjacent reference point from the upper left corner of the target point as an example, the abscissa and the ordinate of the third reference point are X−1 and Y+1 respectively.

In some other embodiments, in a case that the third search is configured to search for one third continuous reference point from the upper right corner of the target point, the abscissa and the ordinate of the third reference point are X+1 and Y+1 respectively. In other embodiments, in a case that the third search is configured to search for one third continuous reference point from the lower left corner of the target point, the abscissa and the ordinate of the third reference point are X+1 and Y−1 respectively.

In other words, a difference between the abscissa of the reference point most adjacent in the diagonal direction and the abscissa of the target point is 1, and a difference between the ordinate of the reference point most adjacent in the diagonal direction and the ordinate of the target point is 1.

In the embodiment, the coding coefficients positioned on the same diagonal position line are stored in the same diagonal storage component 310, and data stored in the diagonal storage component 310 include the abscissas of the coding coefficients. Therefore, whether the coding coefficients stored in the diagonal storage component 310 are the coding coefficients required for entropy decoding on the target point is determined by comparing the abscissa of the target point with the abscissas of the coding coefficients stored in the diagonal storage component 310.

In other embodiments, data stored in the diagonal storage component 310 include the ordinates of the coding coefficients. Therefore, whether the coding coefficients stored in the diagonal storage component 310 are the coding coefficients required for entropy decoding on the target point is determined by comparing the ordinate of the target point with the ordinates of the coding coefficients stored in the diagonal storage component 310.

In the embodiment, the diagonal storage component 310 is configured to store a third latest coding coefficient obtained by performing saturation processing on the coding coefficient, where a bit width of the third latest coding coefficient equals a preset bit number required by the reference point most adjacent to the target point in the diagonal direction, and the target point is a position point currently to be decoded in the coefficient coding block. Therefore, in the step that a third search is performed from a diagonal storage component 310 corresponding to a diagonal position line on which the abscissa and the ordinate are positioned, the coding coefficient of the reference point most adjacent to the target point in the diagonal direction is searched for as the third reference coefficient.

Specifically, in the step that a third search is performed from a diagonal storage component 310 corresponding to a diagonal position line on which the abscissa and the ordinate are positioned, the diagonal storage component corresponding to the target point is determined based on an expression $(N-1)-X+Y$, where N denotes a maximum of a number of rows and a number of columns of a decoding unit, X denotes the abscissa of the target point in the coefficient coding block, and Y denotes the ordinate of the target point in the coefficient coding block.

With reference to FIG. 5 continuously, S105 that entropy decoding is performed on the target point based on extraction results of the first reference coefficients, the second reference coefficients, and the third reference coefficients.

The method for entropy decoding calculation is the same as that in the prior art, which is specifically entropy decoding calculation in versatile video coding (VVC), and will not be repeated herein.

It can be understood that when no reference coefficient of one reference point of the target point is extract, it indicates that a code coefficient of the reference point is not written in the memory structure, and in other words, the coding coefficient of the reference point is 0.

Correspondingly, a chip is further provided in the embodiments of the disclosure. The chip includes the memory structure in the foregoing embodiment.

The memory structure occupies a small area, so that the integration degree of the chip is improved.

Moreover, in a case that the memory structure includes a flip flop structure, a register has a higher response speed, so that the performance of the chip is improved while the integration degree of the chip is improved.

For example, the chip may be a system on chip (SOC) in a smart television or a smart set top box.

Correspondingly, a device is further provided in the embodiments of the disclosure. The device may implement the coefficient storage method according to the embodiment of the disclosure by loading the above coefficient storage method in a form of a program. Alternatively, the device may implement the entropy decoding method according to the embodiment of the disclosure by loading the above entropy decoding method in a form of a program.

With reference to FIG. 6, a structural diagram of hardware of an electronic device according to an embodiment of the disclosure is shown. The device in the embodiment includes: at least one processor 01, at least one communication interface 02, at least one memory 03, and at least one communication bus 04.

In the embodiment, at least one processor 01, at least one communication interface 02, at least one memory 03, and at least one communication bus 04 are provided, and the processor 01, the communication interface 02, and the memory 03 communicate with one another through the communication bus 04.

The communication interface 02 may be an interface of a communication circuit configured to perform network communication, such as an interface of a global system for mobile communications (GSM) circuit.

The processor 01 may be a central processing unit (CPU), an application specific integrated circuit (ASIC), or one or more integrated circuits configured to implement the coefficient storage method or the entropy decoding method in the embodiment.

The memory 03 may encompass a high-speed random access memory (RAM), and may further include a non-volatile memory, such as at least one disk memory. The memory 03 stores one or more computer instructions, where the one or more computer instructions are executed by the processor 01, so as to implement the coefficient storage method according to the foregoing embodiment or the entropy decoding method according to the foregoing embodiment.

It should be noted that the above electronic device may further include other devices (not shown) that may be unnecessary for contents disclosed in the embodiment of the disclosure. These other devices may be unnecessary for understanding the contents disclosed in the embodiment of the disclosure, and thus are not described in sequence in the embodiment of the disclosure.

A storage medium is further provided in the embodiments of the disclosure. The storage medium stores one or more computer instructions, where the one or more computer instructions are configured to implement the coefficient storage method according to the foregoing embodiment or the entropy decoding method according to the foregoing embodiment.

The above implementations of the disclosure are combinations of elements and features of the disclosure. The elements or the features can be deemed optional, unless mentioned otherwise. Each element or feature can be practiced without being combined with other elements or features. Also, the implementations of the disclosure can be configured by combining some elements and/or features. The operation orders described in the implementations of the disclosure can be re-arranged. Some configurations of any implementation can be included in another implementation, and can be replaced with corresponding configurations of another implementation. It is obvious to those skilled in the art that claims that do not have a clear reference relationship with one another in the appended claims can be combined into the implementations of the disclosure, or can be included as new claims in the amendment after filing of the disclosure.

The implementations of the disclosure can be realized by various means such as hardware, firmware, software, or their combinations. In a hardware configuration mode, the method according to the illustrative implementation of the disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration mode, the implementations of the disclosure can be realized in a form of circuits, processes, functions, etc. A software code can be stored in a memory component and executed by the processor. The memory component is positioned inside or outside the processor, and can transmit data to the processor and receive data from the processor by various known means.

By means of the above descriptions of the embodiments disclosed, those skilled in the art can implement or use the disclosure. Various modifications to these embodiments are obvious to those skilled in the art, and the general principles defined herein can be implemented in other embodiments without departing from the spirit or scope of the disclosure. Therefore, the disclosure is not limited to these embodiments illustrated herein, but conforms to the broadest scope consistent with the principles and novel features disclosed herein.

Although disclosed above, the disclosure is not limited to the above. Those skilled in the art can make various changes and modifications without departing from the spirit and scope of the disclosure. Therefore, the scope of protection of the disclosure should be subject to the scope defined by the claims.

What is claimed is:

1. A memory structure, wherein the memory structure is configured to store a coding coefficient, obtained through entropy decoding, in a coefficient coding block; and the memory structure comprises:

a row storage circuit comprising a plurality of row storage components in a number identical to a number of rows of a decoding unit, wherein the row storage components correspond one-to-one to ordinates of the decoding unit, and each row storage component is configured to store a coding coefficient under a corresponding ordinate, and an abscissa of the stored coding coefficient in the coefficient coding block;

a column storage circuit comprising a plurality of column storage components in a number identical to a number of columns of the decoding unit, wherein the column storage components correspond one-to-one to abscissas of the decoding unit, and each column storage component is configured to store a coding coefficient under a corresponding abscissa, and an ordinate of the stored coding coefficient in the coefficient coding block; and a diagonal storage circuit comprising a plurality of diagonal storage components, wherein a number of the diagonal storage components equals 1 subtracted from the sum of the number of rows and the number of columns of the decoding unit, and the diagonal storage components correspond one-to-one to diagonal position lines; the diagonal position lines comprise a diagonal of the decoding unit and a plurality of parallel lines parallel to the diagonal; and each diagonal storage component is configured to store a coding coefficient on a corresponding diagonal position line, and an abscissa or an ordinate of the stored coding coefficient in the coefficient coding block.

2. The memory structure according to claim 1, wherein each row storage component comprises:

a first row storage component configured to store a coding coefficient under a corresponding ordinate, and an abscissa of the stored coding coefficient in the coefficient coding block, wherein the coding coefficient stored in the first row storage component is taken as a first latest coding coefficient; and a second row storage component configured to store a first next latest coding coefficient obtained by performing saturation processing on the first latest coding coefficient currently stored in the first row storage component, and an abscissa corresponding to the first next latest coding coefficient in a case that the first row storage component updates and stores the coding coefficient, wherein the saturation processing is configured to enable a bit width of the first next latest coding coefficient to equal a preset bit number required by a reference point next adjacent to a target point in a row direction, and the target point is a position point currently to be decoded in the coefficient coding block.

3. The memory structure according to claim 1, wherein each column storage component comprises:

a first column storage component configured to store a coding coefficient under a corresponding abscissa, and an ordinate of the stored coding coefficient in the coefficient coding block, wherein the coding coefficient stored in the first column storage component is taken as a second latest coding coefficient; and a second column storage component configured to store a second next latest coding coefficient obtained by performing saturation processing on the second latest coding coefficient currently stored in the first column storage component, and an ordinate corresponding to the second next latest coding coefficient in a case that the first column storage component updates and stores the coding coefficient, wherein the saturation processing is configured to enable a bit width of the second next latest coding coefficient to equal a preset bit number required by a reference point next adjacent to a target point in a column direction, and the target point is a position point currently to be decoded in the coefficient coding block.

4. The memory structure according to claim 1, wherein the diagonal storage component is configured to store a third latest coding coefficient obtained by performing saturation processing on the coding coefficient, wherein a bit width of the third latest coding coefficient equals a preset bit number required by a reference point most adjacent to a target point in a diagonal direction, and the target point is a position point currently to be decoded in the coefficient coding block.

5. The memory structure according to claim 2, wherein the preset bit number required by the reference point is 6 bits.

6. The memory structure according to claim 1, wherein the diagonal storage component corresponding to the coding coefficient is determined based on an expression $(N-1)-X+Y$, wherein N denotes a maximum of the number of rows and the number of columns of the decoding unit, X denotes the abscissa of the coding coefficient in the coefficient coding block, and Y denotes the ordinate of the coding coefficient in the coefficient coding block.

7. The memory structure according to claim 1, wherein the number of the row storage components is identical to a number of rows of a maximum decoding unit; the number of the column storage components is identical to a number of columns of the maximum decoding unit; and the number of the diagonal storage components equals 1 subtracted from the sum of the number of rows and the number of columns of the maximum decoding unit.

8. The memory structure according to claim 7, wherein a size of the maximum decoding unit is 32×32.

9. The memory structure according to claim 1, comprising a flip flop structure or a static random access memory (SRAM) device structure.

10. A coefficient storage method using a memory structure, the memory structure is configured to store a coding coefficient, obtained through entropy decoding, in a coefficient coding block; and the memory structure comprises:

a row storage circuit comprising a plurality of row storage components in a number identical to a number of rows of a decoding unit, wherein the row storage components correspond one-to-one to ordinates of the decoding unit, and each row storage component is configured to store a coding coefficient under a corresponding ordinate, and an abscissa of the stored coding coefficient in the coefficient coding block;

a column storage circuit comprising a plurality of column storage components in a number identical to a number of columns of the decoding unit, wherein the column storage components correspond one-to-one to abscissas of the decoding unit, and each column storage component is configured to store a coding coefficient under a corresponding abscissa, and an ordinate of the stored coding coefficient in the coefficient coding block; and a diagonal storage circuit comprising a plurality of diagonal storage components, wherein a number of the diagonal storage components equals 1 subtracted from the sum of the number of rows and the number of columns of the decoding unit, and the diagonal storage components correspond one-to-one to diagonal position lines; the diagonal position lines comprise a diagonal of the decoding unit and a plurality of parallel lines parallel to the diagonal; and each diagonal storage component is configured to store a coding coefficient on a corresponding diagonal position line, and an abscissa or an ordinate of the stored coding coefficient in the coefficient coding block;

wherein the coefficient storage method is configured to store a coding coefficient, obtained through entropy decoding, in a coefficient coding block; and the coefficient storage method comprises:

storing the coding coefficient and an abscissa of the coding coefficient in the coefficient coding block in a corresponding row storage component based on an ordinate of the coding coefficient in the coefficient coding block;

storing the coding coefficient and the ordinate of the coding coefficient in the coefficient coding block in a corresponding column storage component based on the abscissa of the coding coefficient in the coefficient coding block; and storing the coding coefficient and the abscissa or the ordinate of the coding coefficient in the coefficient coding block in a corresponding diagonal storage component based on a diagonal position line on which the coding coefficient is positioned.

11. The coefficient storage method according to claim 10, wherein each row storage component comprises a first row storage component and a second row storage component; and the storing the coding coefficient and an abscissa of the coding coefficient in the coefficient coding block in a corresponding row storage component comprises: storing the coding coefficient and the abscissa of the coding coefficient in the coefficient coding block in the first row storage component of the corresponding row storage component based on the ordinate of the coding coefficient in the coefficient coding block, wherein the coding coefficient stored in the first row storage component is taken as a first latest coding coefficient; and storing a first next latest coding coefficient obtained by performing saturation processing on the first latest coding coefficient currently stored in the first row storage component, and an abscissa corresponding to the first next latest coding coefficient in the second corresponding row storage component in a case that a next coding coefficient is stored in the first row storage component, wherein the saturation processing is configured to enable a bit width of the first next latest coding coefficient to equal a preset bit number required by a reference point next adjacent to a target point in a row direction, and the target point is a position point currently to be decoded in the coefficient coding block.

12. The coefficient storage method according to claim 10, wherein each column storage component comprises a first column storage component and a second column storage component; and the storing the coding coefficient and the ordinate of the coding coefficient in the coefficient coding block in a corresponding column storage component comprises: storing the coding coefficient and the ordinate of the coding coefficient in the coefficient coding block in the first column storage component of the corresponding row storage component based on the abscissa of the coding coefficient in the coefficient coding block, wherein the coding coefficient stored in the first column storage component is taken as a second latest coding coefficient; and storing a second next latest coding coefficient obtained by performing saturation processing on the second latest coding coefficient currently stored in the first row storage component, and an ordinate corresponding to the second next latest coding coefficient in the second corresponding column storage component in a case that a next coding coefficient is stored in the first column storage component, wherein the saturation processing is configured to enable a bit width of the second next latest coding coefficient to equal a preset bit number required by a reference point next adjacent to a target point in a column direction, and the target point is a position point currently to be decoded in the coefficient coding block.

13. The coefficient storage method according to claim 10, wherein before the storing the coding coefficient and the abscissa or the ordinate of the coding coefficient in the coefficient coding block in a corresponding diagonal storage component, the method further comprises: performing saturation processing on the coding coefficient, so as to obtain a third latest coding coefficient, wherein the saturation processing is configured to enable a bit width of the third latest coding coefficient to equal a preset bit number required by a reference point most adjacent to a target point in a diagonal direction, and the target point is a position point currently to be decoded in the coefficient coding block; and in the storing the coding coefficient and the abscissa or the ordinate of the coding coefficient in the coefficient coding block in a corresponding diagonal storage component, the third latest coding coefficient is stored in the diagonal storage component.

14. The coefficient storage method according to claim 11, wherein the preset bit number required by the reference point is 6 bits.

15. The coefficient storage method according to claim 11, wherein a bit width of the coding coefficient obtained through entropy decoding is j bits; and the saturation processing comprises: determining whether (j−k) highest bits in the coding coefficient are 0; if yes, reserving k lowest bits in the coding coefficient; and if no, reserving only a lowest bit in the coding coefficient, and filling (k−1) remaining bits with 1; wherein k denotes the preset bit number required by the reference point.

16. The coefficient storage method according to claim 10, wherein the storing the coding coefficient and the abscissa or the ordinate of the coding coefficient in the coefficient coding block in a corresponding diagonal storage component based on a diagonal position line on which the coding coefficient is positioned comprises: determining the diagonal storage component corresponding to the coding coefficient based on an expression (N−1)−X+Y, wherein N denotes a maximum of a number of rows and a number of columns of a decoding unit, X denotes the abscissa of the coding coefficient in the coefficient coding block, and Y denotes the ordinate of the coding coefficient in the coefficient coding block.

17. An entropy decoding method, wherein the entropy decoding method is performed based on a coding coefficient stored in a memory structure, the memory structure is configured to store a coding coefficient, obtained through entropy decoding, in a coefficient coding block;

and the memory structure comprises:

a row storage circuit comprising a plurality of row storage components in a number identical to a number of rows of a decoding unit, wherein the row storage components correspond one-to-one to ordinates of the decoding unit, and each row storage component is configured to store a coding coefficient under a corresponding ordinate, and an abscissa of the stored coding coefficient in the coefficient coding block;

a column storage circuit comprising a plurality of column storage components in a number identical to a number of columns of the decoding unit, wherein the column storage components correspond one-to-one to abscissas of the decoding unit, and each column storage component is configured to store a coding coefficient under a corresponding abscissa, and an ordinate of the stored coding coefficient in the coefficient coding block; and a diagonal storage circuit comprising a plurality of diagonal storage components, wherein a number of the diagonal storage components equals 1 subtracted from the sum of the number of rows and the number of columns of the decoding unit, and the diagonal storage components correspond one-to-one to diagonal position lines; the diagonal position lines comprise a diagonal of the decoding unit and a plurality of parallel lines parallel to the diagonal; and each diagonal storage component is configured to store a coding coefficient on a corresponding diagonal position line, and an abscissa or an ordinate of the stored coding coefficient in the coefficient coding block; and the entropy decoding method comprises:

determining an abscissa and an ordinate of a target point in a coefficient coding block, wherein the target point is a position point currently to be decoded in the coefficient coding block;

performing a first search from a row storage component corresponding to the ordinate based on the abscissa and the ordinate corresponding to the target point, wherein the first search is configured to extract coding coefficients of several reference points continuously adjacent to the target point in a row direction as first reference coefficients;

performing a second search from a column storage component corresponding to the abscissa based on the abscissa and the ordinate corresponding to the target point, wherein the second search is configured to extract coding coefficients of several reference points continuously adjacent to the target point in a column direction as second reference coefficients;

performing a third search from a diagonal storage component corresponding to a diagonal position line on which the abscissa and the ordinate are positioned based on the abscissa and the ordinate corresponding to the target point, wherein the third search is configured to extract coding coefficients of several reference points continuously adjacent to the target point in a diagonal direction as third reference coefficients; and performing entropy decoding on the target point based on extraction results of the first reference coefficients, the second reference coefficients, and the third reference coefficients.

18. The entropy decoding method according to claim 17, wherein each row storage component comprises: a first row storage component configured to store a coding coefficient under a corresponding ordinate, and an abscissa of the stored coding coefficient in the coefficient coding block, and the coding coefficient stored in the first row storage component is taken as a first latest coding coefficient; and a second row storage component configured to store a first next latest coding coefficient obtained by performing saturation processing on the first latest coding coefficient currently stored in the first row storage component, and an abscissa corresponding to the first next latest coding coefficient in a case that the first row storage component updates and stores the coding coefficient, wherein the saturation processing is configured to enable a bit width of the first next latest coding coefficient to equal a preset bit number required by a reference point next adjacent to the target point in the row direction, and the target point is a position point currently to be decoded in the coefficient coding block; and the performing a first search from a row storage component corresponding to the ordinate comprises: searching for a first latest coding coefficient of a reference point most adjacent to the target point in the row direction as one first reference coefficient from the first row storage component of the row storage component corresponding to the ordinate; and searching for a first next latest coding coefficient of a reference point next adjacent to the target point in the row direction as one first reference coefficient from the second row storage component of the row storage component corresponding to the ordinate.

19. The entropy decoding method according to claim 17, wherein each column storage component comprises: a first column storage component configured to store a coding coefficient under a corresponding abscissa, and an ordinate of the stored coding coefficient in the coefficient coding block, and the coding coefficient stored in the first column storage component is taken as a second latest coding coefficient; and a second column storage component configured to store a second next latest coding coefficient obtained by performing saturation processing on the second latest coding coefficient currently stored in the first column storage component, and an ordinate corresponding to the second next latest coding coefficient in a case that the first column storage component updates and stores the coding coefficient, wherein the saturation processing is configured to enable a bit width of the second next latest coding coefficient to equal a preset bit number required by a reference point next adjacent to the target point in the column direction, and the target point is a position point currently to be decoded in the coefficient coding block; and the performing a second search from a column storage component corresponding to the abscissa comprises: searching for a second latest coding coefficient of a reference point most adjacent to the target point in the column direction as one second reference coefficient from the first column storage component of the column storage component corresponding to the abscissa; and searching for a second next latest coding coefficient of a reference point next adjacent to the target point in the column direction as one second reference coefficient from the second column storage component of the column storage component corresponding to the abscissa.

20. The entropy decoding method according to claim 17, wherein the diagonal storage component is configured to store a third latest coding coefficient obtained by performing saturation processing on the coding coefficient, wherein a bit width of the third latest coding coefficient equals a preset bit number required by a reference point most adjacent to the target point in the diagonal direction, and the target point is a position point currently to be decoded in the coefficient coding block; and in the performing a third search from a diagonal storage component corresponding to a diagonal position line on which the abscissa and the ordinate are positioned, a coding coefficient of a reference point most adjacent to the target point in the diagonal direction is searched for as the third reference coefficient.

* * * * *